(12) United States Patent
Takakubo

(10) Patent No.: US 6,717,705 B2
(45) Date of Patent: Apr. 6, 2004

(54) SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/294,615

(22) Filed: Nov. 15, 2002

(65) Prior Publication Data

US 2003/0197912 A1 Oct. 23, 2003

(30) Foreign Application Priority Data

Nov. 16, 2001 (JP) .................................... 2001-351847

(51) Int. Cl.[7] .............................................. G02B 26/08
(52) U.S. Cl. ...................... 359/207; 359/204; 359/216
(58) Field of Search ................................. 359/204–207, 359/216–219; 347/233, 244, 258–259

(56) References Cited

U.S. PATENT DOCUMENTS

| | | | | |
|---|---|---|---|---|
| 5,541,760 A | * | 7/1996 | Iizuka | 359/207 |
| 6,317,245 B1 | | 11/2001 | Hama et al. | |
| 6,348,989 B2 | * | 2/2002 | Aoki et al. | 359/205 |
| 6,392,772 B1 | | 5/2002 | Hama et al. | |
| 6,392,773 B1 | | 5/2002 | Hama et al. | |
| 6,396,615 B1 | | 5/2002 | Hama et al. | |

FOREIGN PATENT DOCUMENTS

| | | |
|---|---|---|
| JP | 2-58014 | 2/1990 |
| JP | 8-122673 | 5/1996 |
| JP | 10133131 | 5/1998 |
| JP | 11-64754 | 3/1999 |

* cited by examiner

Primary Examiner—James Phan
(74) Attorney, Agent, or Firm—Greenblum & Bernstein, P.L.C.

(57) ABSTRACT

A scanning optical system is provided with a light source that emits at least one beam, an anamorphic optical element that converges the at least one beam in an auxiliary scanning direction, a polygonal mirror, and an imaging optical system. The imaging optical system has a scanning lens, and a compensation lens. One surface of the scanning lens has an anamorphic aspherical surface whose curvature in the auxiliary scanning direction is determined independently from a cross-sectional shape thereof along the main scanning direction. Further, one surface of the compensation lens has an aspherical surface in which a tilt angle of a cross-sectional shape in the auxiliary scanning direction changes with a position in the main scanning direction, the aspherical surface being asymmetrical with respect to a plane perpendicular to the auxiliary scanning direction and including a central point thereof.

16 Claims, 26 Drawing Sheets

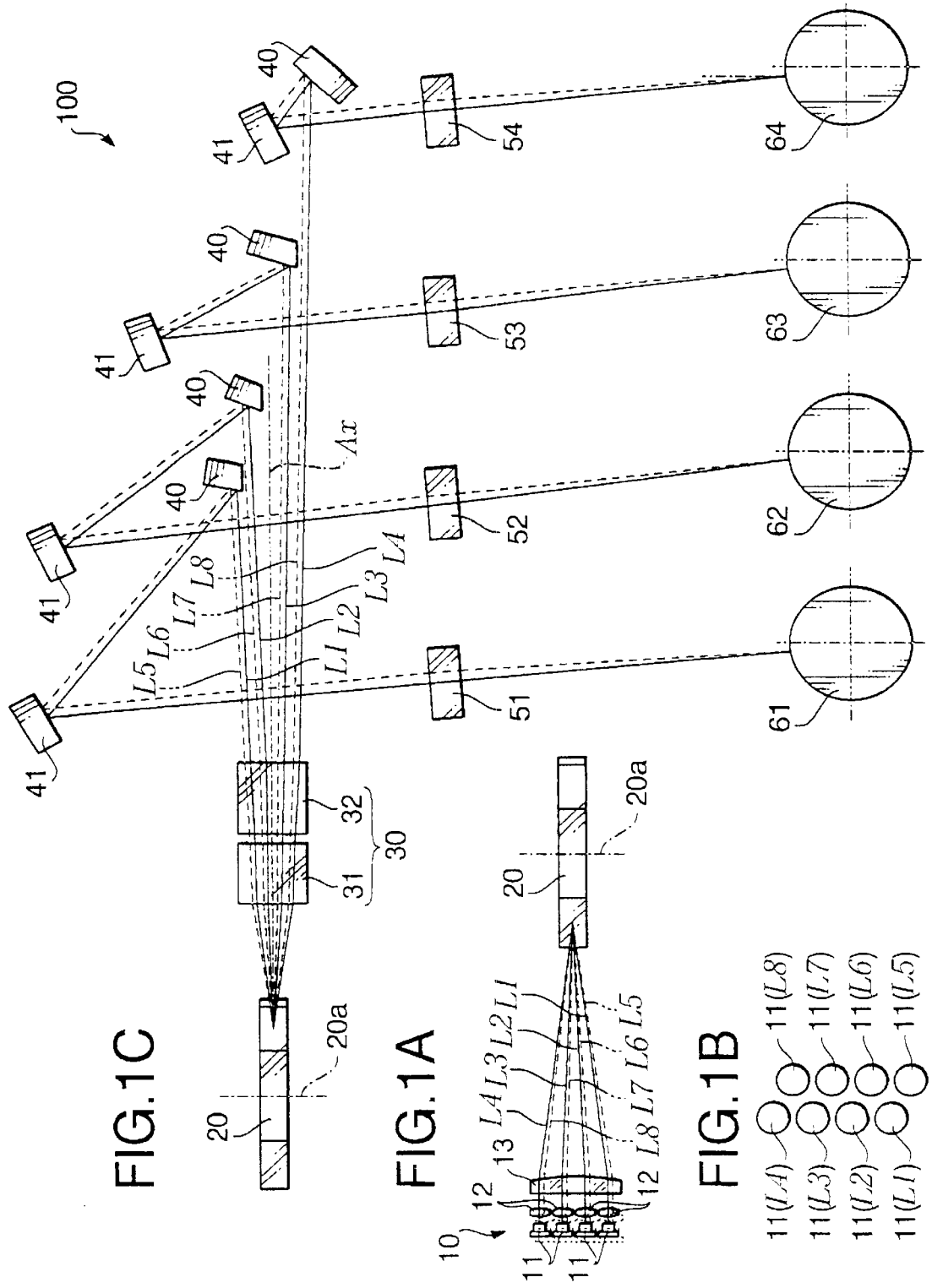

BOW (OUTER BEAM)

BOW (INNER BEAM)

DIFFERENTIAL BOW (OUTER BEAM)

DIFFERENTIAL BOW (INNER BEAM)

fθ CHARACTERISTIC
(OUTER BEAM)

fθ CHARACTERISTIC
(INNER BEAM)

CURVATURE OF FIELD
(OUTER BEAM)

CURVATURE OF FIELD
(INNER BEAM)

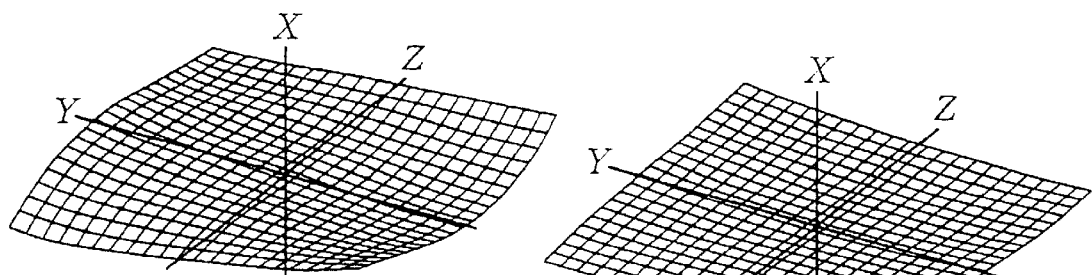
FIG.11A  Y=108
FIG.11B  Y=0
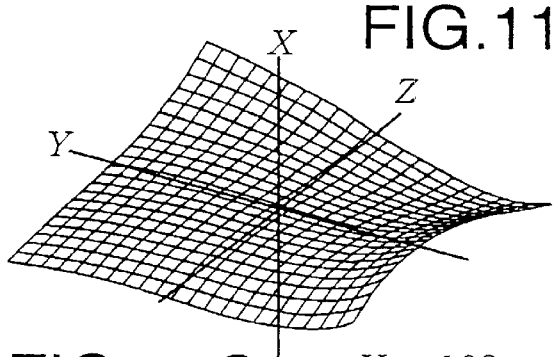
FIG.11C  Y=-108
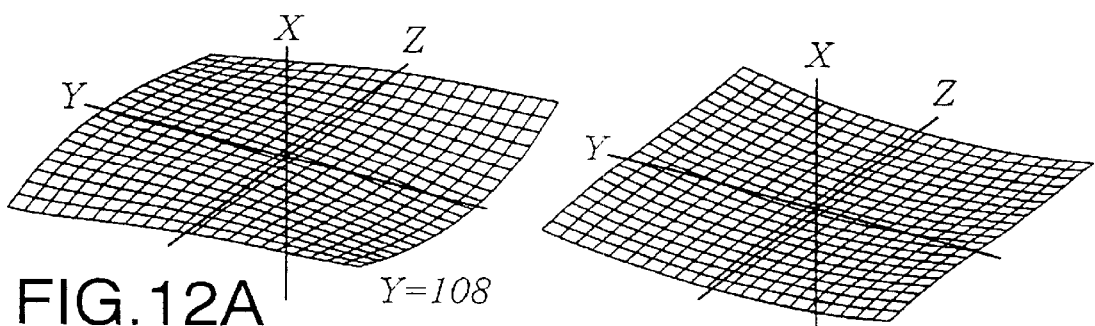
FIG.12A  Y=108
FIG.12B  Y=0
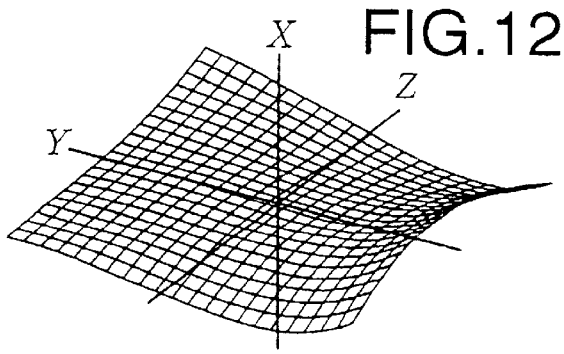
FIG.12C  Y=-108

BOW (OUTER BEAM)

BOW (INNER BEAM)

DIFFERENTIAL BOW (OUTER BEAM)

DIFFERENTIAL BOW (INNER BEAM)

fθ CHARACTERISTIC
(OUTER BEAM)

fθ CHARACTERISTIC
(INNER BEAM)

CURVATURE OF FIELD
(OUTER BEAM)

CURVATURE OF FIELD
(INNER BEAM)

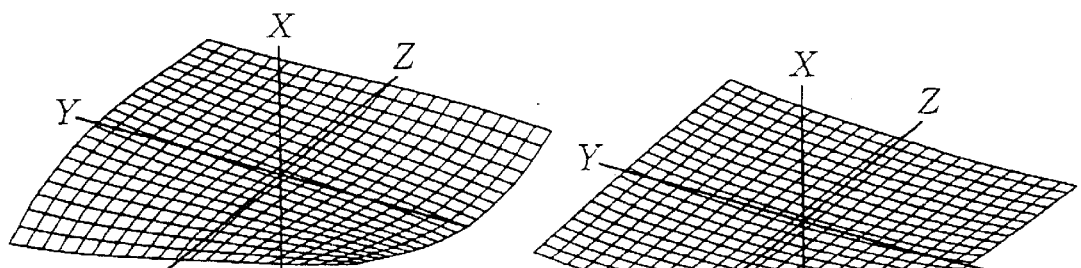
FIG.21A  Y=106
FIG.21B  Y=0
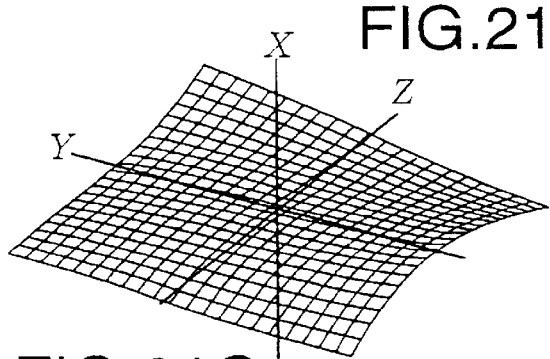
FIG.21C  Y=-108
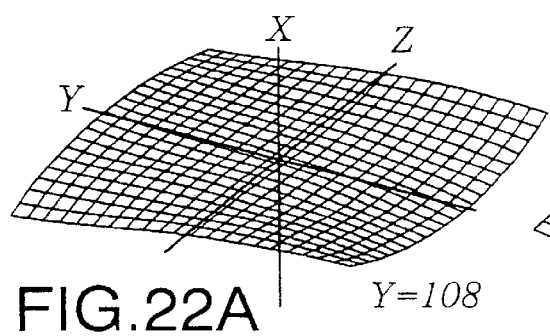
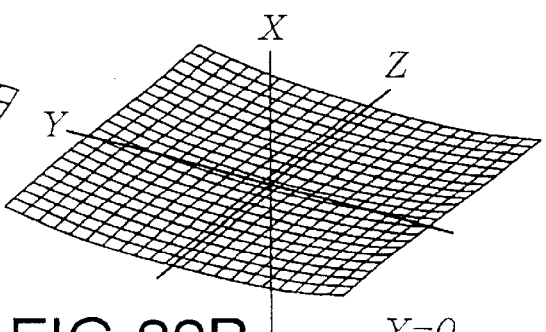
FIG.22A  Y=108
FIG.22B  Y=0
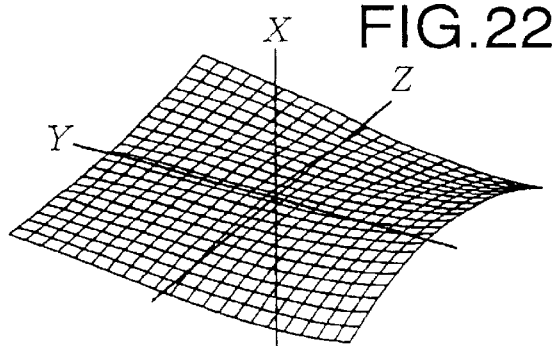
FIG.22C  Y=-108

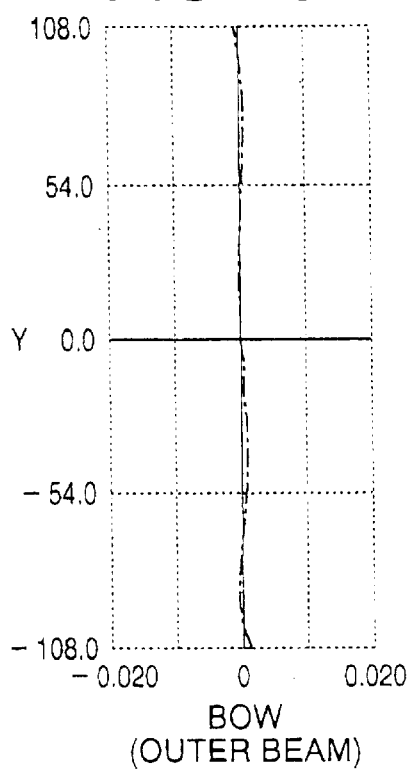
FIG.26A BOW (OUTER BEAM)
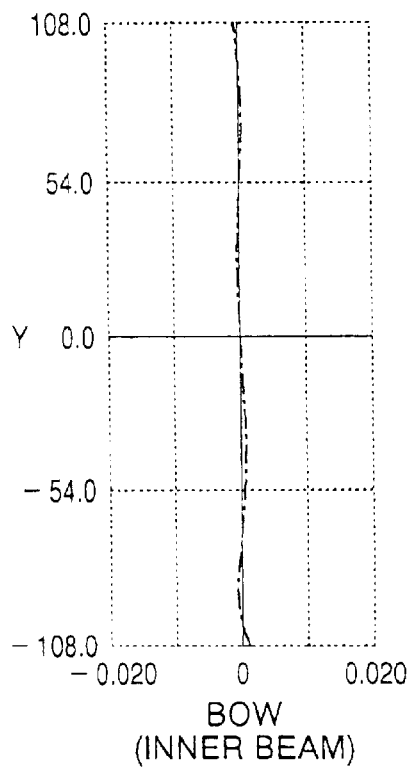
FIG.26B BOW (INNER BEAM)
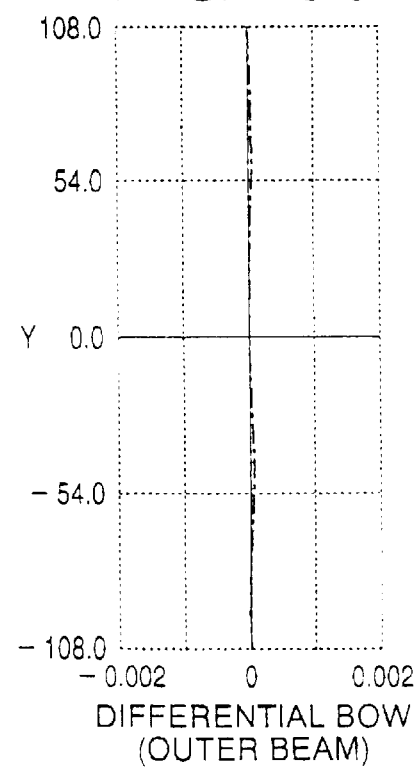
FIG.26C DIFFERENTIAL BOW (OUTER BEAM)
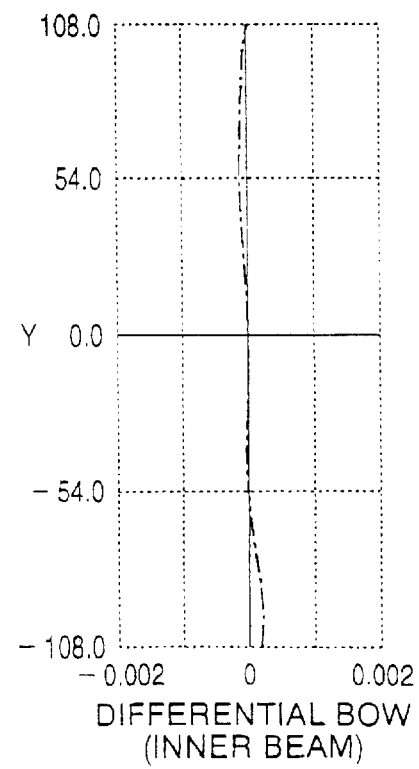
FIG.26D DIFFERENTIAL BOW (INNER BEAM)

fθ CHARACTERISTIC
(OUTER BEAM)

fθ CHARACTERISTIC
(INNER BEAM)

CURVATURE OF FIELD
(OUTER BEAM)

CURVATURE OF FIELD
(INNER BEAM)

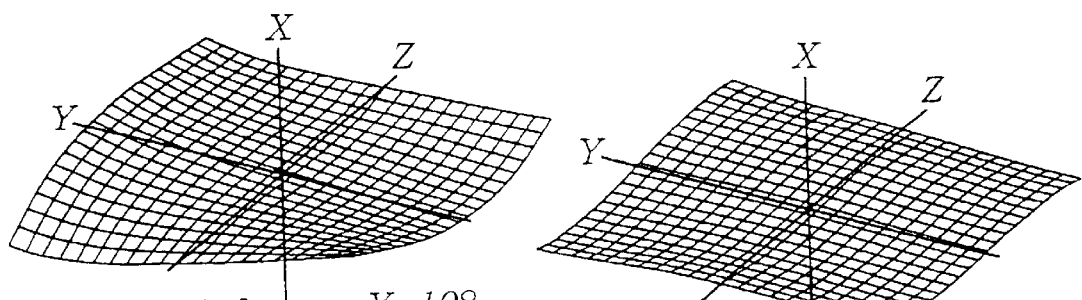
FIG.31A  Y=108
FIG.31B  Y=0
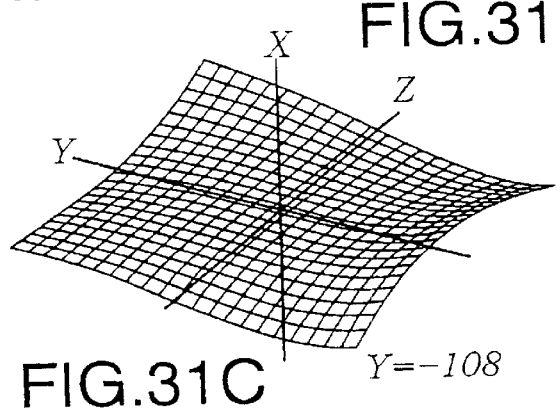
FIG.31C  Y=-108
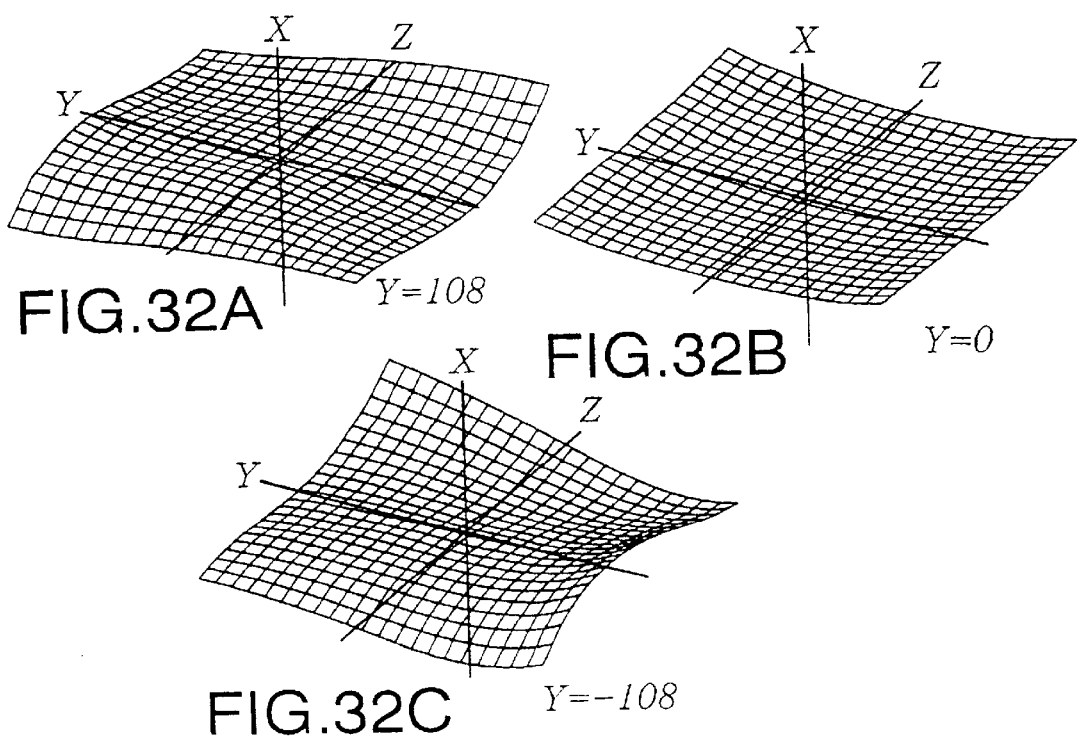
FIG.32A  Y=108
FIG.32B  Y=0
FIG.32C  Y=-108

BOW
(OUTER BEAM)

BOW
(INNER BEAM)

DIFFERENTIAL BOW
(OUTER BEAM)

DIFFERENTIAL BOW
(INNER BEAM)

fθ CHARACTERISTIC
(OUTER BEAM)

fθ CHARACTERISTIC
(INNER BEAM)

CURVATURE OF FIELD
(OUTER BEAM)

CURVATURE OF FIELD
(INNER BEAM)

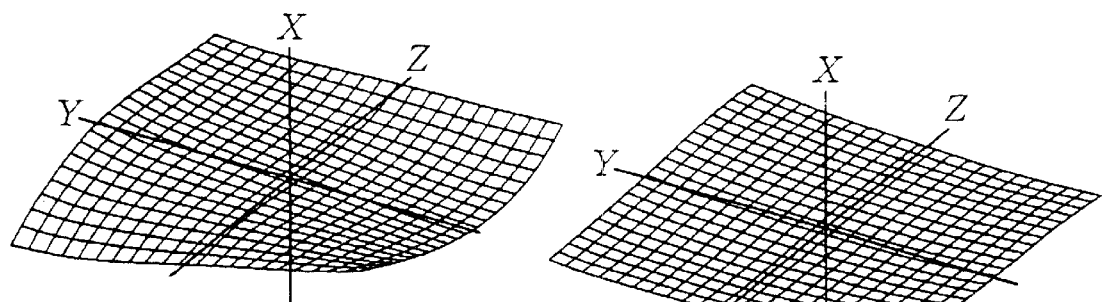
FIG.41A  Y=106
FIG.41B  Y=0
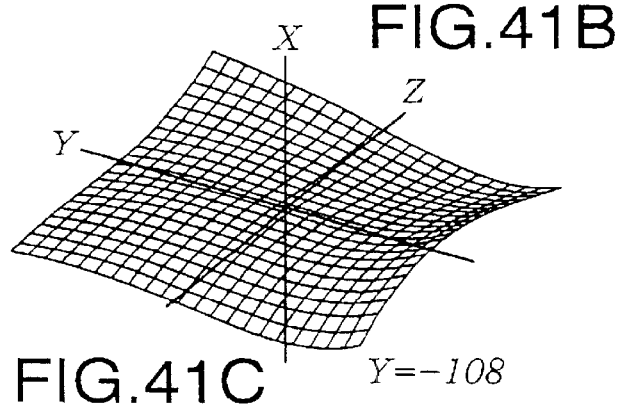
FIG.41C  Y=-108
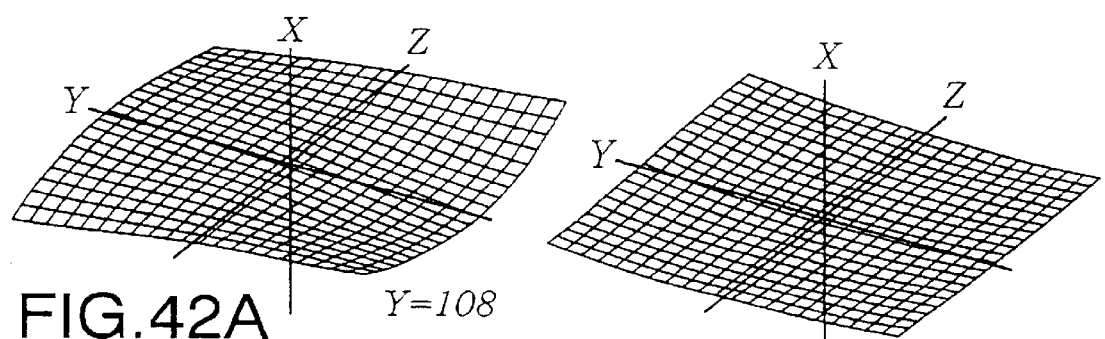
FIG.42A  Y=108
FIG.42B  Y=0
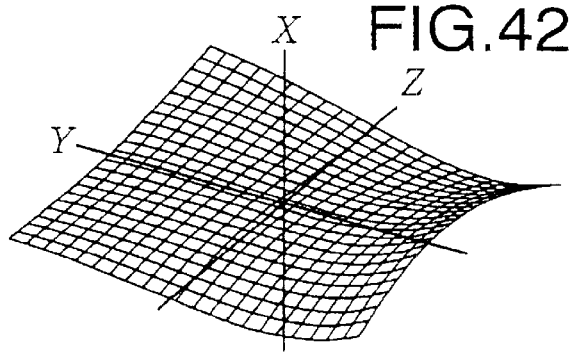
FIG.42C  Y=-108

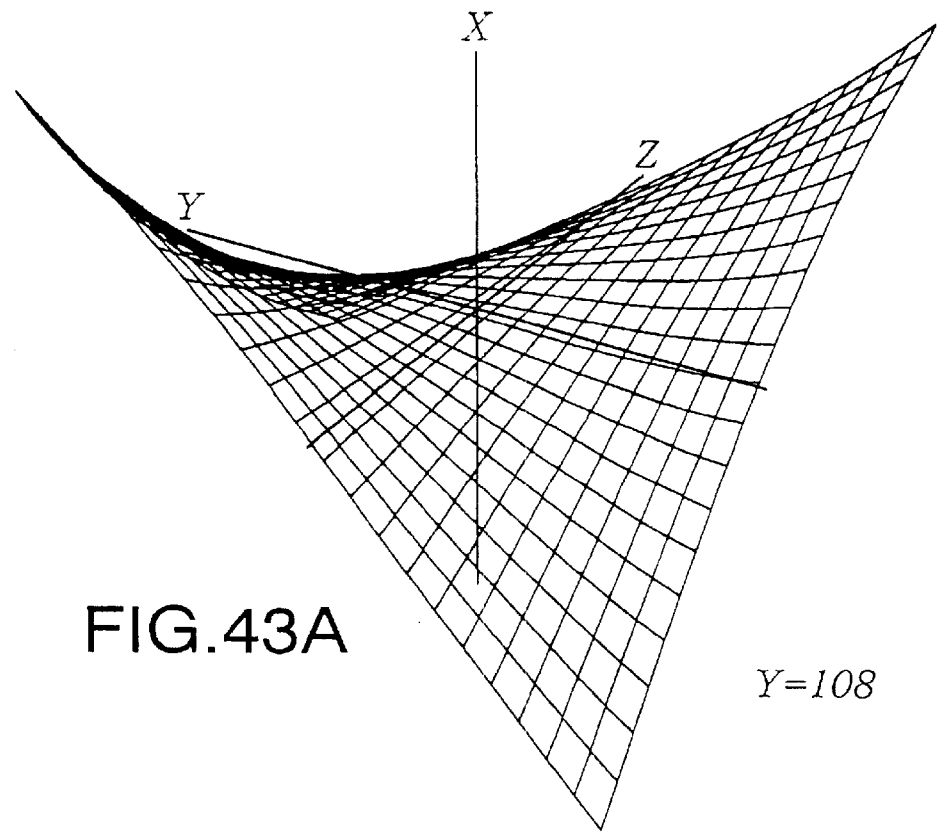
FIG.43A   Y=108
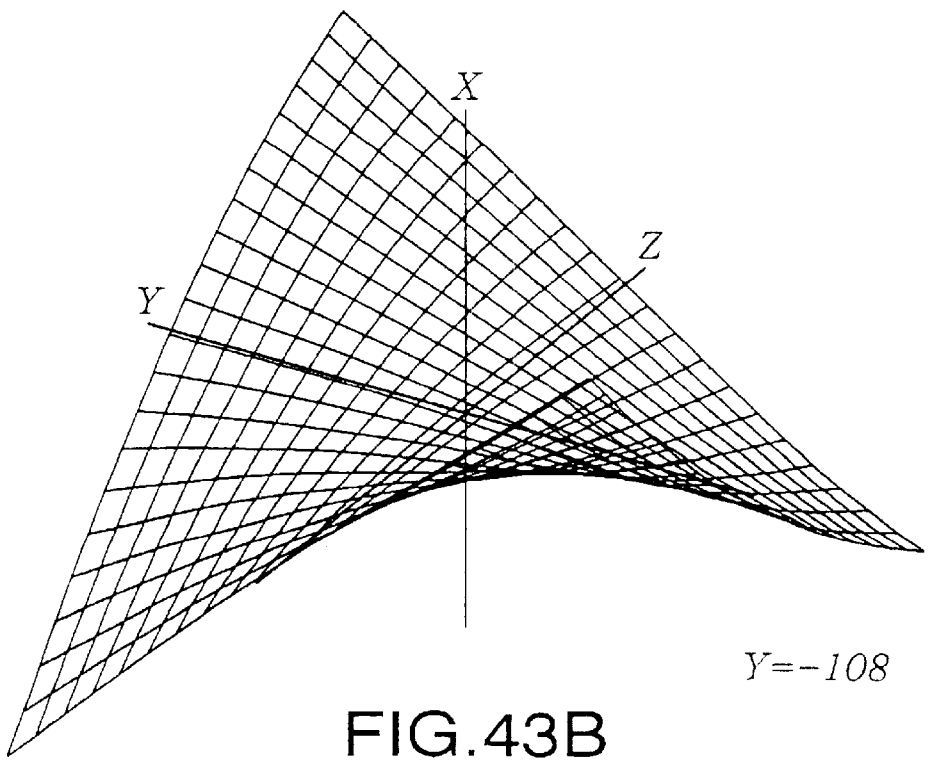
Y=-108   FIG.43B

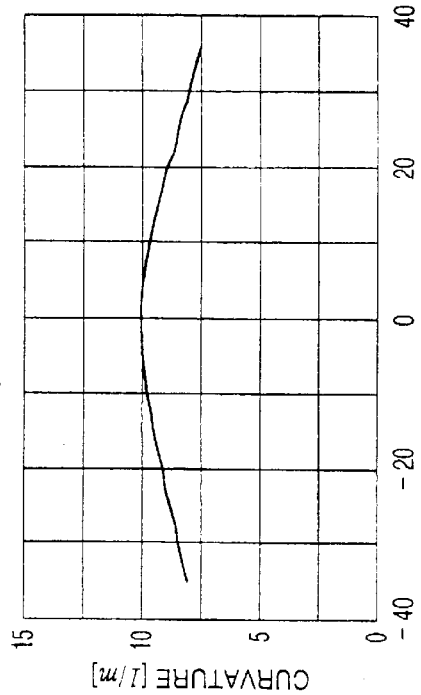
FIG.44A FIRST EXAMPLE
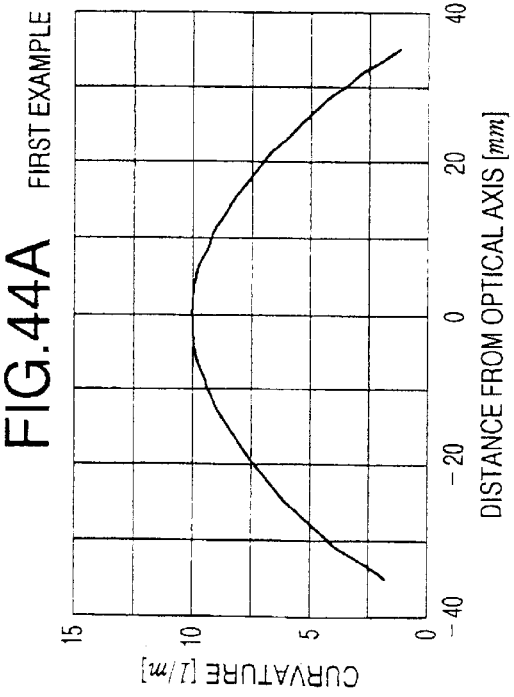
FIG.44B SECOND EXAMPLE
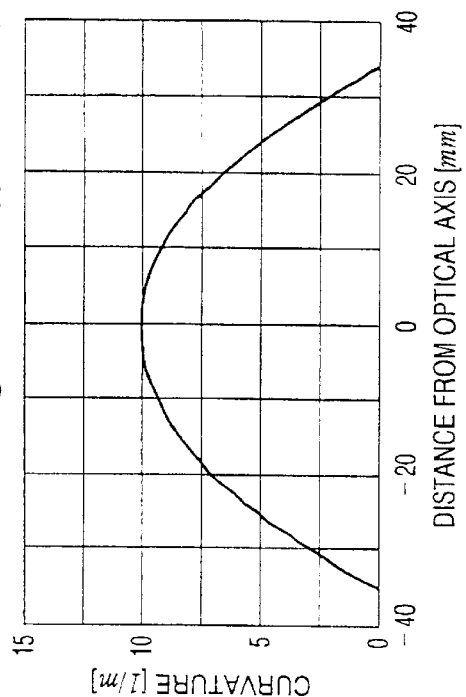
FIG.44C THIRD EXAMPLE
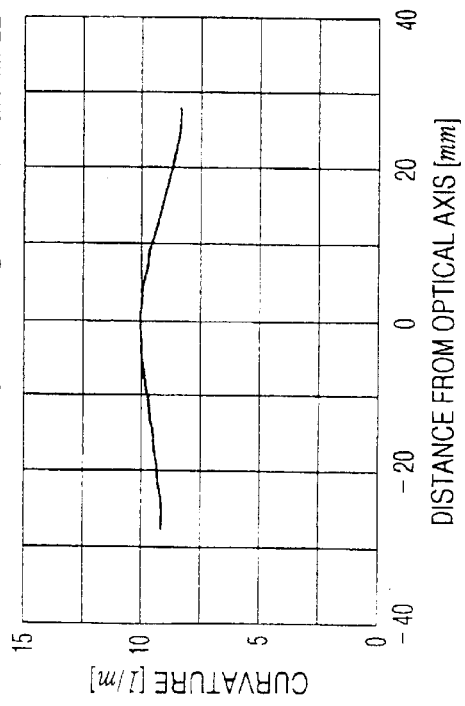
FIG.44D FOURTH EXAMPLE

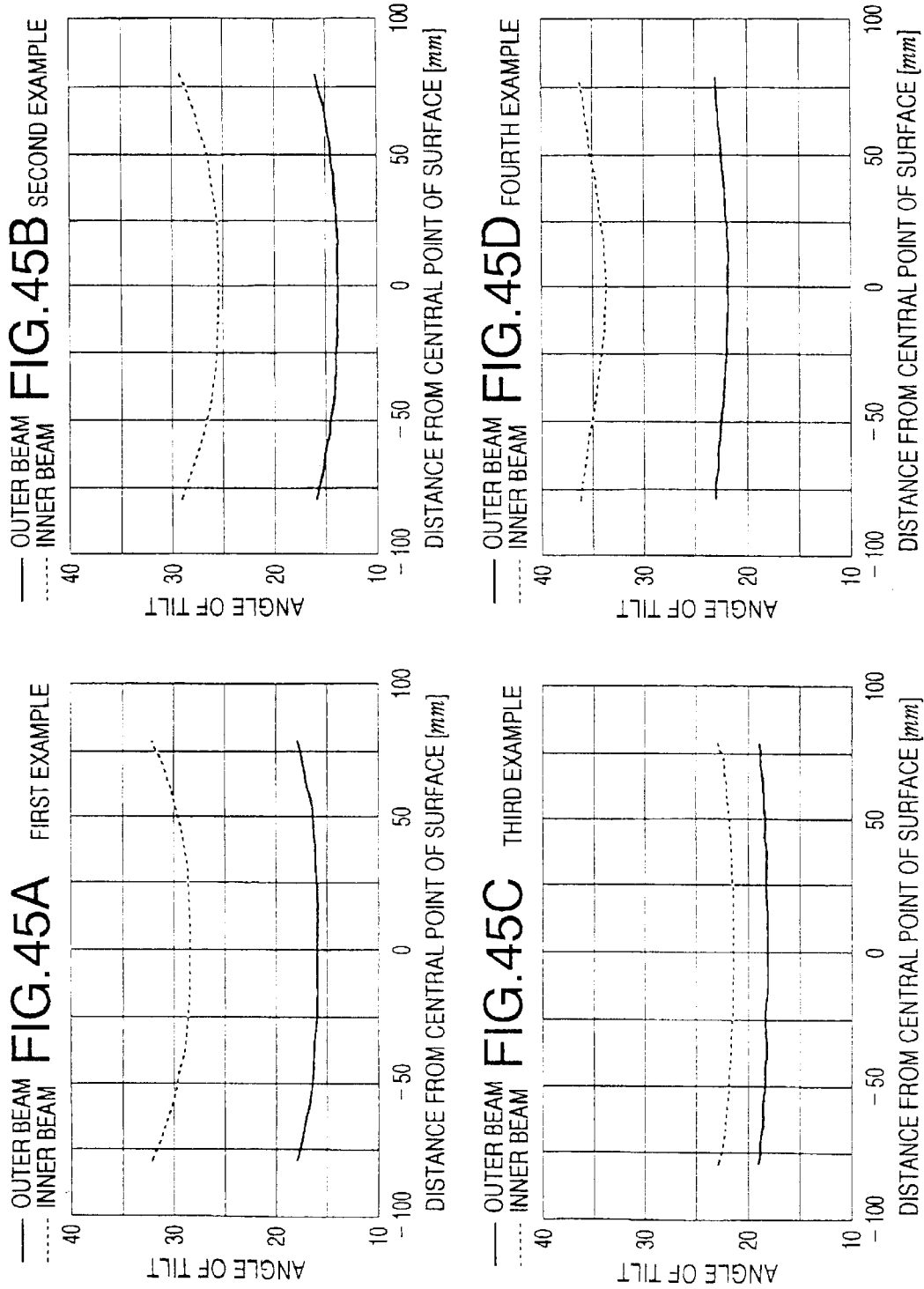

SCANNING OPTICAL SYSTEM

BACKGROUND OF THE INVENTION

The present invention relates to a scanning optical system employed in a scanning optical device such as a laser beam printer or the like.

In a scanning optical system for a laser beam printer, a laser beam emitted by a laser diode is deflected by a polygonal mirror to scan within a predetermined angular range. The scanning beam passes through an fθ lens, which converges the beam to form a scanning beam spot on a photoconductive surface. As the polygonal mirror rotates, the beam spot moves on the photoconductive surface. By ON/OFF modulating the beam spot as it moves, an electrostatic latent image is formed on the photoconductive surface. Hereinafter, a direction, on the photoconductive surface, in which the beam spot moves as the polygonal mirror rotates is referred to as a main scanning direction, while a direction perpendicular to the main scanning direction, on the photoconductive surface, is referred to as an auxiliary scanning direction.

Further, shape and direction of power of each optical element is described with reference to directions on the photoconductive surface. Further, a plane perpendicular to a rotation axis of the polygonal mirror and including an optical axis of a scanning lens is defined as a main scanning plane.

Sometimes, a multi-beam scanning optical system is configured such that a plurality of beams are deflected simultaneously by a single polygonal mirror. With such a configuration, since the single polygonal mirror is used as a deflector for each of the plurality of beams, the number of optical elements can be decreased, and a room for such elements can be reduced. If the plurality of beams are respectively inclined in the auxiliary scanning direction, and are incident on substantially the same point on the polygonal mirror, the thickness of the polygonal mirror can be reduced, which reduces a manufacturing cost of the polygonal mirror.

However, if a laser beam is incident on the polygonal mirror as inclined in the auxiliary scanning direction, a bow occurs, that is, a scanning line, which is defined as a locus of a beam on a surface to be scanned, curves.

In addition, the degree of a curve of the scanning line varies according to an incident angle of the laser beam impinging on the polygonal mirror in the auxiliary scanning direction. Therefore, if the multi-beam scanning optical system is configured to form more than one scanning line at predetermined intervals on one photoconductive surface simultaneously, a distance between adjacent scanning lines varies according to positions in the main scanning direction. Such a change of the distance between adjacent scanning lines is called a differential bow.

Since both of the bow and the differential bow deteriorate an imaging accuracy, these should be suppressed particularly for a high-resolution scanning system.

SUMMARY OF THE INVENTION

It is therefore an object of the invention to provide an improved scanning optical system that is configured to compensate for the bow and the differential bow while satisfying essential characteristics for a scanning optical system such as a fθ characteristic, correction of a curvature of field and the like.

For the object, according to the invention, there is provided a scanning optical system for emitting at least one beam scanning in a main scanning direction. The scanning optical system is provided with a light source that emits at least one beam, an anamorphic optical element that converges the at least one beam emitted by the light source in an auxiliary scanning direction, a polygonal mirror that rotates and deflects the at least one beam emerged from the anamorphic optical element to scan in the main scanning direction within a predetermined angular range, and an imaging optical system that converges the at least one beam deflected by the polygonal mirror to form at least one beam spot on a surface to be scanned, the at least one beam spot scanning in the main scanning direction on the surface to be scanned.

In the above configuration, the imaging optical system has a scanning lens, and at least one compensation lens provided on the surface side with respect to said scanning lens, the at least one compensation lens compensating for curvature of field. Further, one surface of the scanning lens has an anamorphic aspherical surface, said anamorphic aspherical surface being defined as a surface whose curvature in the auxiliary scanning direction at a point spaced from an optical axis thereof in the main scanning direction is determined independently from a cross-sectional shape thereof along the main scanning direction.

Further, one surface of the at least one compensation lens has an aspherical surface, the aspherical surface being defined as a surface in which a tilt angle of a cross-sectional shape in the auxiliary scanning direction changes with a position in the main scanning direction, the aspherical surface being asymmetrical with respect to a plane perpendicular to the auxiliary scanning direction and including a central point thereof.

With this configuration, it becomes possible to determine a power of the imaging optical system in the auxiliary scanning direction independently from a power in the main scanning direction. Accordingly, it becomes possible to compensate for a bow and a differential bow which are aberrations in the auxiliary scanning direction.

Since, with the above configuration, a curve of a scanning line (i.e., a bow) is well suppressed, it is not necessary to use a toric surface in the imaging optical system. Therefore, all surfaces except for the anamorphic aspherical surface of the scanning lens and the aspherical surface of the compensation lens can be formed as rotational symmetrical surfaces.

In a particular case, the anamorphic aspherical surface of the scanning lens may be configured such that a cross-sectional shape thereof in the auxiliary scanning direction is formed as an arc.

Optionally, the curvature of the anamorphic aspherical surface in the auxiliary scanning direction may decrease as a distance from the optical axis increases.

In a particular case, the aspherical surface of the at least one compensation lens may be defined by a two-dimensional polynomial expression in which a SAG amount between a point on the aspherical surface and a plane tangential to the aspherical surface at the central point is defined by coordinates along the main scanning direction and the auxiliary scanning direction.

Optionally, the tilt angle of the cross-sectional shape of the aspherical surface in the auxiliary scanning direction may increase as a distance from the central point of said aspherical surface increases. By using the aspherical surface defined by the two-dimensional polynomial expression, it becomes possible to prevent a widening of the beam spot due to a fluctuation of a wavefront.

In another case, the light source may emit a plurality of beams, the plurality of beams including first beams whose incident angles with respect to the polygonal mirror in the auxiliary scanning direction are different from each other. Further, the scanning lens may have a single lens through which the plurality of beams deflected by said polygonal mirror pass, and the at least one compensation lens may include a plurality of compensation lenses through which the first beams pass, respectively.

Optionally, the plurality of beams may include second beams whose incident angles with respect to the polygonal mirror in the auxiliary scanning direction are substantially the same, and the second beams emerged from the scanning lens enter the same compensation lens.

Further optionally, the anamorphic aspherical surface of the scanning lens may be symmetrical with respect to a line intersecting the optical axis and parallel with the main scanning direction, and the aspherical surface of each of the plurality of compensation lenses may be symmetrical with respect to a line intersecting the central point thereof and parallel with the auxiliary scanning direction.

Further optionally, the first beams may include two beams, incident angles of the two beams with respect to the polygonal mirror in the auxiliary scanning direction having opposite signs and absolute values of the incident angles of the two beams being the same, and two of the plurality of compensation lenses through which the two beams respectively pass are arranged such that the two of the plurality of compensation lenses are symmetrical with respect to a line extending along the optical axis of the scanning lens.

In another case, the first beams may include inner beams and outer beams, incident angles of the outer beams with respect to said polygonal mirror in the auxiliary scanning direction are greater than those of said inner beams. In such a configuration, the scanning optical system may satisfy a condition:

$$0.95 \times \Delta\beta \leq \Delta dx/dz \leq 1.05 \times \Delta\beta$$

where, $$\Delta\beta = \beta out/\beta in;$$

$$\Delta dx/dz = (b2-b1)/(a2-a1);$$

βout is an angle when incident angles of the outer beams in the auxiliary scanning direction with respect to said polygonal mirror are represented by ±βout;

βin is an angle when incident angles of said inner beams in the auxiliary scanning direction with respect to said polygonal mirror are represented by ±βin;

a1 is an angle when angles formed between the inner beams situated at a central position within the predetermined angular range and the anamorphic aspherical surface of said scanning lens are represented by ±a1, the angles ±a1 being defined in a plane parallel with an auxiliary scanning plane that is a plane parallel with a rotational axis of said polygonal mirror and including the optical axis of the scanning lens;

a2 is an angle when angles formed between the inner beams situated at a marginal position within the predetermined angular range and the anamorphic aspherical surface of said scanning lens are represented by ±a2, the angles ±a2 being defined in a plane parallel with the auxiliary scanning plane;

b1 is an angle when angles formed between the outer beams situated at a central position within the predetermined angular range and the anamorphic aspherical surface of said scanning lens are represented by ±b1, the angles ±b1 being defined in a plane parallel with the auxiliary scanning plane; and b2 is an angle when angles formed between the outer beams situated at a marginal position within the predetermined angular range and the anamorphic aspherical surface of said scanning lens are represented by ±b2, the angles ±b2 being defined in a plane parallel with the auxiliary scanning plane.

Alternatively or additionally, the scanning optical system may satisfy a condition:

$$0.9 \times \Delta\beta \leq \Delta dx0/dz0 \leq 1.1 \times \Delta\beta$$

where, $$\Delta\beta = \beta out/\beta in;$$

$$\Delta dx0/dz0 = (b20-b10)/(a20-a10);$$

a10 is an angle when angles formed between the inner beams situated at a central position within the predetermined angular range and aspherical surfaces of corresponding compensation lenses for the inner beams are represented by ±a10, the angles ±a10 being defined in a plane parallel with an auxiliary scanning plane that is a plane parallel with a rotational axis of said polygonal mirror and including the optical axis of the scanning lens;

a20 is an angle when angles formed between the inner beams situated at a marginal position within the predetermined angular range and the aspherical surfaces of corresponding compensation lenses for the inner beams are represented by ±a20, the angles ±a20 being defined in a plane parallel with the auxiliary scanning plane;

b10 is an angle when angles formed between the outer beams situated at a central position within the, predetermined angular range and aspherical surfaces of corresponding compensation lenses for the outer beams are represented by ±b10, the angles ±b10 being defined in a plane parallel with the auxiliary scanning plane; and b20 is an angle when angles formed between the outer beams situated at a marginal position within the predetermined angular range and the aspherical surfaces of corresponding compensation lenses for the outer beams are represented by ±b20, the angles ±b20 being defined in a plane parallel with the auxiliary scanning plane.

In another case, the scanning lens may have a first lens made of plastic and a second lens made of glass.

Alternatively, the scanning lens may have a single lens made of plastic.

Alternatively, the compensation lens provided for each of the first beams may have a single lens made of plastic.

In another case, the light source may emit a plurality of beams including first beams and second beams, the first beams impinging on one reflection surface of the polygonal mirror and the second beams impinging on another reflection surface of the polygonal mirror. In this case, the first beams include two beams, incident angles of the two beams of the first beams with respect to the one reflection surface of the polygonal mirror in the auxiliary scanning direction having opposite signs, absolute values of the incident angles of the two beams of the first beams being the same. Further, the second beams include two beams, incident angles of the two beams of the second beams with respect to the other reflection surface of the polygonal mirror in the auxiliary scanning direction having opposite signs, absolute values of the incident angles of the two beams of the second beams being the same. Further, the scanning lens includes first lens and second lens, the first beams deflected by the one surface of the polygonal mirror passing through the first lens, the second beams deflected by the other surface of the polygonal mirror passing through the second lens. Further, the at least one compensation lens includes four single lenses, each of the four single lenses compensating for curvature of field, four beams including the two beams of the first beams and the two beams of the second beams passing through the four single lenses, respectively.

In another case, the anamorphic aspherical surface of the scanning lens may be configured such that the cross-sectional shape in the main scanning direction is defined as a function of a distance, in the main scanning direction, from the optical axis of the scanning lens, and the curvature in the auxiliary scanning direction is defined as a function of a distance, in the main scanning direction, from the optical axis, the cross-sectional shape in the main scanning direction and the curvature in the auxiliary scanning direction being defined independently from each other.

BRIEF DESCRIPTION OF THE ACCOMPANYING DRAWINGS

FIG. 1A shows a side view of a light source unit and a polygonal mirror of a scanning optical system to which the present invention is applicable;

FIG. 1B shows an arrangement of laser diodes provided in the light source unit of the scanning optical system viewed from the polygonal mirror;

FIG. 1C shows a side view of the scanning optical system on a photoconductive drum side thereof;

FIG. 11A is a graph showing a wavefront aberration of the scanning optical'system of the first example with regard to the outer beam at image height Y=108 mm;

FIG. 11B is a graph showing a wavefront aberration of the scanning optical system of the first example with regard to the outer beam at image height Y=0 mm;

FIG. 11C is a graph showing a wavefront aberration of the scanning optical system of the first example with regard to the outer beam at image height Y=−108 mm;

FIG. 12A is a graph showing a wavefront aberration of the scanning optical system of the first example with regard to the inner beam at image height Y=108 mm;

FIG. 12B is a graph showing a wavefront aberration of the scanning optical system of the first example with regard to the inner beam at image height Y=0 mm;

FIG. 12C is a graph showing a wavefront aberration of the scanning optical system of the first example with regard to the inner beam at image height Y=−108 mm;

FIG. 21A is a graph showing a wavefront aberration of the scanning optical system of the second example with regard to the outer beam at image height Y=108 mm;

FIG. 21B is a graph showing a wavefront aberration of the scanning optical system of the second example with regard to the outer beam at image height Y=0 mm;

FIG. 21C is a graph showing a wavefront aberration of the scanning optical system of the second example with regard to the outer beam at image height Y=−108 mm;

FIG. 22A is a graph showing a wavefront aberration of the scanning optical system of the second example with regard to the inner beam at image height Y=108 mm;

FIG. 22B is a graph showing a wavefront aberration of the scanning optical system of the second example with regard to the inner beam at image height Y=0 mm;

FIG. 22C is a graph showing a wavefront aberration of the scanning optical system of the second example with regard to the inner beam at image height Y=−108 mm;

FIG. 26A is a graph showing a bow as to the outer beam in the third example;

FIG. 26B is a graph showing the bow as to the inner beam in the third example;

FIG. 26C is a graph showing a differential bow with regard to outer beams impinging on the same photoconductive drum in the third example;

FIG. 26D is a graph showing the differential bow with regard to inner beams impinging on the same photoconductive drum in the third example;

FIG. 31A is a graph showing a wavefront aberration of the scanning optical system of the third example with regard to the outer beam at image height Y=108 mm;

FIG. 31B is a graph showing a wavefront aberration of the scanning optical system of the third example with regard to the outer beam at image height Y=0 mm;

FIG. 31C is a graph showing a wavefront aberration of the scanning optical system of the third example with regard to the outer beam at image height Y=−108 mm;

FIG. 32A is a graph showing a wavefront aberration of the scanning optical system of the third example with regard to the inner beam at image height Y=108 mm;

FIG. 32B is a graph showing a wavefront aberration of the scanning optical system of the third example with regard to the inner beam at image height Y=0 mm;

FIG. 32C is a graph showing a wavefront aberration of the scanning optical system of the third example with regard to the inner beam at image height Y=−108 mm;

FIG. 41A is a graph showing a wavefront aberration of the scanning optical system of the fourth example with regard to the outer beam at image height Y=108 mm;

FIG. 41B is a graph showing a wavefront aberration of the scanning optical system of the fourth example with regard to the outer beam at image height Y=0 mm;

FIG. 41C is a graph showing a wavefront aberration of the scanning optical system of the fourth example with regard to the outer beam at image height Y=−108 mm;

FIG. 42A is a graph showing a wavefront aberration of the scanning optical system of the fourth example with regard to the inner beam at image height Y=108 mm;

FIG. 42B is a graph showing a wavefront aberration of the scanning optical system of the fourth example with regard to the inner beam at image height Y=0 mm;

FIG. 42C is a graph showing a wavefront aberration of the scanning optical system of the fourth example with regard to the inner beam at image height Y=−108 mm;

FIG. 43A is a graph showing a wavefront aberration at image height Y=108 mm if an aspherical surface defined by a two-dimensional polynomial expression of each of the compensation lenses provided in the scanning optical system according to the first example is replaced with a toric surface;

FIG. 43B is a graph showing a wavefront aberration in the same condition as FIG. 43A at image height Y=−108 mm;

FIG. 44A is a graph showing a curvature of an arc of an anamorphic aspherical surface of the scanning lens extending in the auxiliary scanning direction in the first example;

FIG. 44B is a graph showing a curvature of an arc of an anamorphic spherical surface of the scanning lens extending in the auxiliary scanning direction in the second example;

FIG. 44C is a graph showing a curvature of an arc of an anamorphic aspherical surface of the scanning lens extending in the auxiliary scanning direction in the third example;

FIG. 44D is a graph showing a curvature of an arc of an anamorphic aspherical surface of the scanning lens extending in the auxiliary scanning direction in the fourth example;

FIG. 45A is a graph showing an angle of a tilt of a cross-sectional shape of the compensation lens of the first example in a plane parallel with the auxiliary scanning plane;

FIG. 45B is a graph showing the angle of the tilt of the cross-sectional shape of the compensation lens of the second example in a plane parallel with the auxiliary scanning plane;

FIG. 45C is a graph showing the angle of the tilt of the cross-sectional shape of the compensation lens of the third example in a plane parallel with the auxiliary scanning plane;

FIG. 45D is a graph showing the angle of the tilt of the cross-sectional shape of the compensation lens of the fourth example in a plane parallel with the auxiliary scanning plane.

DETAILED DESCRIPTION OF THE EMBODIMENTS

Figure 2A:
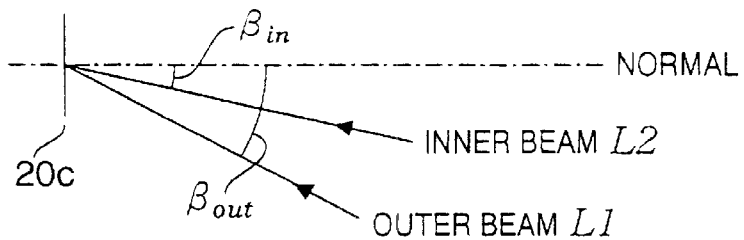
FIG. 2A illustrates incident angles of βout and βin.
Figure 2B:
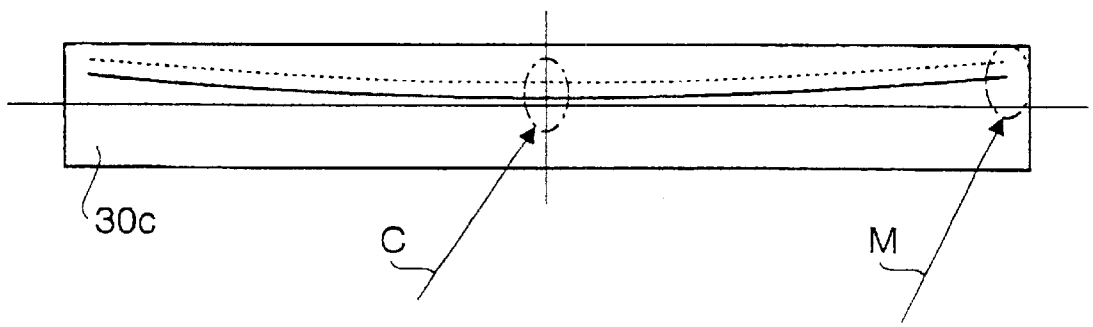
FIG. 2B illustrates a scanning lens and beams situated at a central position and a marginal position.
Figure 2C:
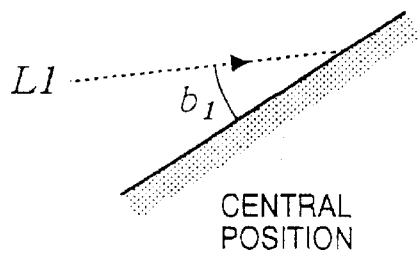
FIGS. 2C–2F illustrate angles of b1, b2, a1, and a2, respectively.
Figure 2D:
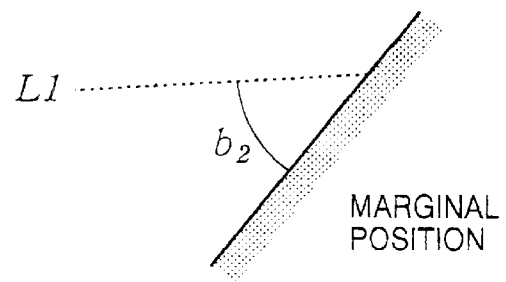
Figure 2E:
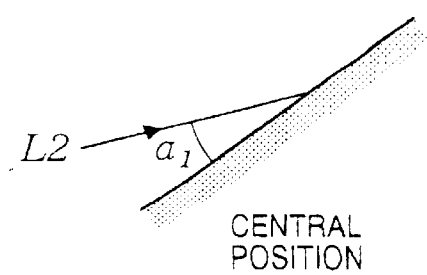
Figure 2F:
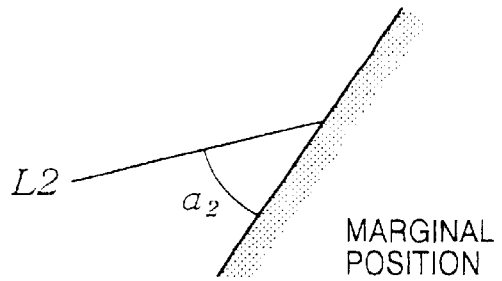

Hereinafter, an embodiment according to the invention are described with reference to the accompanying drawings.

FIG. 1A shows a side view of a light source unit 10 and a polygonal mirror 20 of a so-called tandem scanning optical system 100 to which the present invention is applicable. FIG. 1B shows an arrangement of laser diodes provided in the light source unit 10 viewed from the polygonal mirror. FIG. 1C shows a side view of the scanning optical system 100 on a photoconductive drum side thereof.

As shown in FIG. 1A, the light source unit 10 of the scanning optical system 100 includes eight laser diodes (11,11, . . . ), and eight collimator lenses (12,12, . . . ) which collimate divergent beams emitted by the laser diodes, respectively.

As shown in FIG. 1B, the eight laser diodes are aligned in two vertical columns and four lateral rows. The vertical direction and the lateral direction in FIG. 1B correspond to the auxiliary scanning direction and the main scanning direction, respectively.

Four pairs of beams (L1, L5), (L2, L6), (L3, L7) and (L4, L8) are incident on photoconductive drums 61, 62, 63 and 64, respectively. All of the four pairs of beams impinge on the polygonal mirror 20, with incident angles of two beams (e.g., L1 and L5) included in one pair of beams in the auxiliary scanning being slightly different from each other. Since a difference of an angle between the two beams traveling to the same photoconductive drum are negligible, the difference of the angle is ignored in the following description.

Each of the beams L1–L8 collimated by the collimator lens 12 is directed by a prism (not shown) such that the eight beams L1–L8 are aligned in line in the auxiliary scanning direction. Each of the beams L1–L8 emerged from the collimator lens 12 is incident on a cylindrical lens 13 which has a positive power only in the auxiliary scanning direction.

Further, the beams L1–L8 are deflected, due to a prism effect of the cylindrical lens 13, and incident on a substantially same position on a reflection surface of the polygonal mirror 20. Due to the refraction power of the cylindrical lens 13, a line-like image, which extends in the main scanning direction, is formed on a plane closely adjacent to a reflection surface of the polygonal mirror 20.

Therefore, the eight beams emitted by the light source unit 10 are incident on the polygonal mirror 20 as being inclined with respect to a main scanning plane which is defined as a plane perpendicular to a rotational axis 20a of the polygonal mirror 20 and including an optical axis Ax of a scanning lens 30. The eight beams intersect with each other substantially on a reflection surface of the polygonal mirror 20. That is, incident angles of inner beams L1, L4 (or L5, L8) with respect to the polygonal mirror 20 have opposite signs and whose absolute values are equal. Similarly, incident angles of outer beams L2, L3 (or L6, L7) with respect to the polygonal mirror 20 have opposite signs and whose absolute values are equal.

As shown in FIG. 1C, the eight beams L1–L8 are simultaneously deflected by the polygonal mirror 20 rotating about its rotational axis 20a. The eight beams are deflected by the polygonal mirror 20 at their respective predetermined incident angles in an auxiliary scanning plane which is defined as a plane perpendicular to the main scanning plane and including the optical axis Ax of the scanning lens 30. The eight beams deflected by the polygonal mirror 20 enter the scanning lens 30 including a first lens 31 and a second lens 32. Each beam emerged from the scanning lens 30 is reflected by mirrors 40 and 41, and passes through the corresponding compensation lens 51–54. Then, each beam is converged onto the corresponding photoconductive drum 61–64.

With such a configuration, two beam spots scanning in the main scanning direction are formed on each of the photoconductive drums 61–64. Since the eight beams L1–L8 are deflected by the polygonal mirror 20 within a predetermined angular range, two scanning lines are formed on each of the photoconductive drums 61–64.

The cylindrical lens 13 has a function as an anamorphic optical element that converges a beam emitted by the light source unit 10 in the auxiliary scanning direction. The scanning lens 30 and each of the compensation lenses 51–54 function as an imaging optical system that converges a beam reflected by the polygonal mirror 20 on a surface to be scanned to form a beam spot scanning in the main scanning direction thereon.

One surface of the scanning lens 30 is formed as an anamorphic aspherical surface whose cross-sectional shapes in the main scanning direction and in the auxiliary scanning direction are independently defined. Further, each of the cross-sectional shapes in the main scanning direction and in the auxiliary scanning direction is defined as a function of a distance from the optical axis of the scanning lens 30. The cross-sectional shape in the auxiliary scanning direction is formed as an arc whose curvature gradually decrease as the distance from the optical axis Ax increases. The anamorphic aspherical surface is symmetrical with respect to a line extending along the optical axis of the scanning lens 30.

One surface of each of the compensation lenses 51–54 is formed as an aspherical surface which is asymmetrical with respect to a plane perpendicular to the auxiliary scanning direction and including a central point (i.e., an origin point of a coordinate system in which a surface is defined) thereof. Further, an angle of a tilt of a cross-sectional shape of the aspherical surface in a plane parallel with the auxiliary scanning plane changes with positions in the main scanning direction.

The aspherical surface of each of the compensation lenses 51–54 is defined by a two-dimensional polynomial expression which defines a SAG amount. More specifically, the SAG amount between a point on the aspherical surface and a plane tangential to the aspherical surface at the origin point is defined by positions along the main scanning direction and the auxiliary scanning direction. Further, the aspherical surface is symmetrical with respect to a line extending in the auxiliary scanning direction and including the origin point thereof. Further, the angle of the tilt of the cross-sectional shape of the aspherical surface in the auxiliary scanning direction increases as a distance, in the main scanning direction, from the origin point increases.

The compensation lenses 51 and 54 for the outer beams are identical, and are arranged such that one of the compensation lenses 51 and 54 is placed at a position rotated about the optical axis Ax of the scanning lens 30 by an angle of 180° with respect to a position of the other when the scanning optical system 100 is developed. Also, the compensation lenses 52 and 53 for the inner beams are identical, and are arranged such that one of the compensation lenses 52 and 53 is placed at a position rotated about the optical axis Ax of the scanning lens 30 by an angle of 180° with respect to a position of the other when the scanning optical system 100 is developed.

It should be noted that an angle of each inner beam with respect to the optical axis Ax and an angle of each outer beam with respect to the optical axis Ax are different. Therefore, the compensation lens 51 (54) for the outer beams has different configuration from the compensation lens 52 (53) for the inner beams. That is, in the scanning optical system 100, two kinds of compensation lenses are provided.

In this embodiment, aspherical surfaces of the compensation lens 51 for the outer beams and the compensation lens 52 for the inner beams defined by two-dimensional polynomial expressions are different from each other. The other surfaces of the compensation lenses 51–54 opposite to the respective aspherical surfaces defined by two-dimensional polynomial expressions are the same.

The scanning optical system 100 satisfies condition (1):

$$0.95 \times \Delta\beta \leq \Delta dx/dz \leq 1.05 \times \Delta\beta \tag{1}$$

where, $$\Delta\beta = \beta out/\beta in,$$

$$\Delta dx/dz = (b2-b1)/(a2-a1),$$

$\beta$out is an angle when incident angles of the outer beams (L1, L5, L4, L8) in the auxiliary scanning direction with respect to the polygonal mirror 20 are represented by ±$\beta$out, $\beta$in is an angle when incident angles of the inner beams (L2, L6, L3, L7) in the auxiliary scanning direction with respect to said polygonal mirror 20 are represented by ±$\beta$in, a1 is an angle when angles formed between the inner beams situated at a central position C within the predetermined angular range and the anamorphic aspherical surface of the scanning lens 30 are represented by ±a1, the angles ±a1 being defined in a plane parallel with the auxiliary scanning plane, a2 is an angle when angles formed between the inner beams situated at a marginal position M within the predetermined angular range and the anamorphic aspherical surface of the scanning lens 30 are represented by ±a2, the angles ±a2 being defined in a plane parallel with the auxiliary scanning plane, b1 is an angle when angles formed between the outer beams situated at a central position C within the predetermined angular range and the anamorphic aspherical surface of the scanning lens 30 are represented by ±b1, the angles ±b1 being defined in a plane parallel with the auxiliary scanning plane, and b2 is an angle when angles formed between the outer beams situated at a marginal position M within the predetermined angular range and the anamorphic aspherical surface of the scanning lens 30 are represented by ±b2, the angles ±b2 being defined in a plane parallel with the auxiliary scanning plane.

FIGS. 2A–2F illustrates these angles $\beta$out, $\beta$in, b1, b2, a1 and a2. As shown in FIG. 2A, $\Delta\beta$ represents a ratio $\beta$out/$\beta$in between the incident angle $\beta$in of the inner beam L2 and the incident angle $\beta$out of the outer beam L1 with respect to a reflection surface 20c of the polygonal mirror 20 in a plane parallel with the auxiliary scanning plane. As shown in FIGS. 2B–2F, $\Delta dx/dz$ represents a ratio (b2−b1)/(a2−a1) between a change of an angle formed by the outer beam and the anamorphic aspherical surface 30c of the scanning lens 30 (b2−b1), and a change of an angle formed by the inner beam and the anamorphic aspherical surface (a2−a1).

The scanning optical system 100 satisfies condition (2):

$$0.9 \times \Delta\beta \leq \Delta dx0/dz0 \leq 1.1 \times \Delta\beta \tag{2}$$

where, $$\Delta dx0/dz0 = (b20-b10)/(a20-a10),$$

a10 is an angle when angles formed between the inner beams situated at a central position C within the predetermined angular range and the aspherical surface of the corresponding compensation lens defined by two-dimensional polynomial expression are represented by ±a10, the angles ±a10 being defined in a plane parallel with the auxiliary scanning plane, a20 is an angle when angles formed between the inner beams situated at a marginal position M within the predetermined angular range and the aspherical surface of the corresponding compensation lens defined by two-dimensional polynomial expression are represented by ±a20, the angles ±a20 being defined in a plane parallel with the auxiliary scanning plane, b10 is an angle when angles formed between the outer beams situated at a central position C within the predetermined angular range and the aspherical surface of the corresponding compensation lens defined by two-dimensional polynomial expression are represented by ±b10, the angles ±b10 being defined in a plane parallel with the auxiliary scanning plane, and b20 is an angle when angles formed between the outer beams situated at a marginal position M within the predetermined angular range and the aspherical surface of the corresponding compensation lens defined by two-dimensional polynomial expression are represented by ±b20, the angles ±b20 being defined in a plane parallel with the auxiliary scanning plane.

Since the degree of a curve of a scanning line (i.e., the degree of a bow) is proportional to the magnitude of an incident angle of the beam with respect to the polygonal mirror 20 in the auxiliary scanning direction, the ratios Δdx/dz and Δdx0/dz0 regarding the aspherical surfaces of the scanning lens and the compensation lens as well as the ratio of the incident angle βout/βin regarding the polygonal mirror 20 are determined according to the magnitude of the incident angle of the beam with respect to the polygonal mirror 20. In this embodiment, the ratios Δdx/dz and Δdx0/dz0 are determined to satisfy condition (1) and condition (2), respectively. Therefore, the curve of the scanning line is well compensated.

In this embodiment, the scanning optical system in which two beams are incident on a photoconductive drum simultaneously is described, however, it is also possible to apply the invention to the type of a scanning optical system in which one laser beam is incident on a corresponding photoconductive drum.

Hereinafter, four concrete examples of the scanning optical system 100 according to the embodiment will be described.

FIRST EXAMPLE

Figure 3:
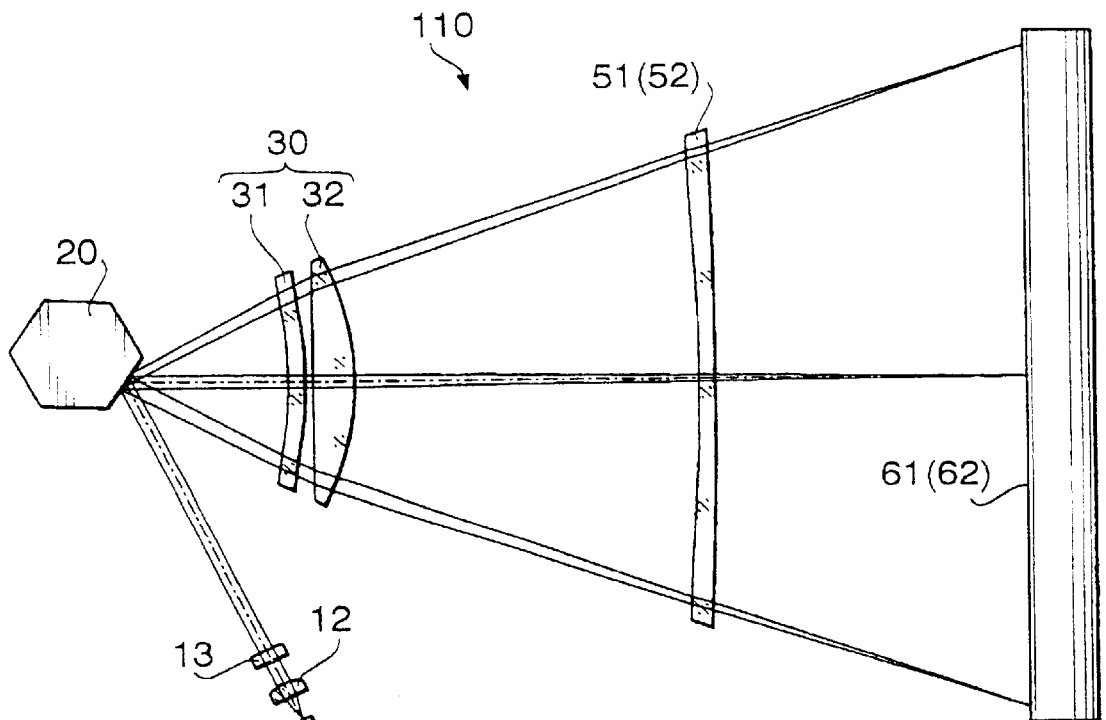
FIG. 3 is a developed view of a scanning optical system according to a first example viewed from a line parallel with a rotational axis of the polygonal mirror.
Figure 4:
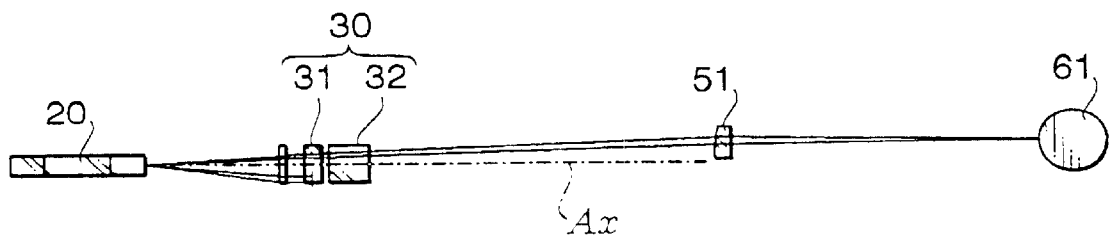
FIG. 4 is a developed view of the scanning optical system of the first example with regard to an outer beam viewed from a line parallel with the main scanning direction.
Figure 5:
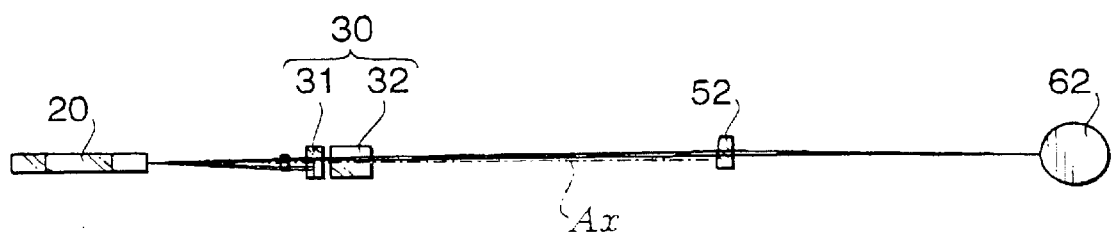
FIG. 5 is a developed view of the scanning optical system of the first example with regard to an inner beam viewed from a line parallel with the main scanning direction.

FIGS. 3–5 show a scanning optical system 110 according to a first example. FIG. 3 is a developed view of the scanning optical system 110 viewed from a line parallel with the rotational axis of the polygonal mirror 20. FIG. 4 is a developed view of the scanning optical system 110 with regard to the outer beam L1 viewed from a line parallel with the main scanning direction. FIG. 5 is a developed view of the scanning optical system 110 with regard to the inner beam L2 viewed from a line parallel with the main scanning direction.

In FIGS. 3–5, to elements which are similar to those in FIG. 1, the same reference numbers are assigned, and the detailed description thereof will not be repeated. As shown in FIG. 3, in the first example, the scanning lens 30 includes two lenses. A first lens 31 of the scanning lens 30 is made of plastic, and a second lens 32 is made of glass. Each of the compensation lenses 51–54 is made of plastic.

TABLE 1 indicates a numerical structure of the scanning optical system 110 from the light incident side of the cylindrical lens 13 to the photoconductive drum. In TABLE 1, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51(54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam.

In TABLE 1, Ry denotes a radius (unit: mm) of curvature in the main scanning direction, Rz denotes a radius (unit: mm) of curvature in the auxiliary scanning direction (If a surface is rotationally symmetrical, no value is indicated). Further, d denotes a distance (unit: mm) between adjacent surfaces on the optical axis Ax, n denotes a refractive index at a design wavelength of 780 nm, and DECZ denotes a decentering amount (unit: mm) of each surface when the scanning optical system 110 is developed. Each incident angle with respect to the polygonal mirror 20 is an angle formed between a central axis of the beam impinging on the polygonal mirror 20 and the reflection surface of the polygonal mirror.

TABLE 1 focal length = 200 mm
scanning width = 216 mm
design wavelength = 780 nm
incident angle with respect to polygonal mirror:
65° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | −100.00 | 2.50 | — | — |
| #6 | ∞ | — | 11.50 | 1.51072 | 0.00 |
| #7 | −100.00 | — | 102.50 | — | — |
| #8 | −592.00 | — | 5.00 | 1.48617 | 6.00 |
| #9 | −1800.00 | — | 91.88 | — | — |
| #10 | ∞ | — | 0.00 | — | 6.00 |
| #11 | −592.80 | — | 5.00 | 1.48617 | 2.50 |
| #12 | −1800.00 | — | 91.88 | — | — |
| #13 | ∞ | — | 0.00 | — | 2.08 |

In TABLE 1, surface #1 is a cylindrical surface, surfaces #2 and #3 are planar surfaces, surface #4 is a rotationally symmetrical aspherical surface, surface #5 is an anamorphic aspherical surface. Surface #6 is a planar surface, surface #7 is a spherical surface, surface #8 and #11 are aspherical surfaces defined by two-dimensional polynomial expressions, surface #9 and #12 are aspherical surfaces.

The rotationally symmetrical aspherical surface is expressed by following equation:

$$X(h) = \frac{Ch^2}{1 + \sqrt{1 - (1+\kappa)C^2h^2}} + A_4 h^4 + A_6 h^6 + \ldots \quad (3)$$

where, X(h) represents a SAG amount which is a distance between a point on the aspherical surface at a height of h from the optical axis and a plane tangential to the aspherical surface at the optical axis. C represents a curvature (1/r) on the optical axis. κ represents a conical coefficient, and $A_4$ and $A_6$ are aspherical coefficients of $4^{th}$ and $6^{th}$ orders, respectively. The radii of curvatures of the rotationally symmetrical aspherical surfaces in TABLE 1 are those on the optical axis. Conical coefficients and aspherical coefficients are indicated in TABLE 2.

TABLE 2

| κ | 0.00 |
|---|---|
| $A_4$ | $1.58 \times 10^{-6}$ |
| $A_6$ | $2.39 \times 10^{-10}$ |

The anamorphic aspherical surface is defined by the following equation.

$$X(Y) = \frac{CY^2}{1 + \sqrt{1 - (1+\kappa)C^2 Y^2}} + \sum_{n=1} AM_n Y^n \quad (4)$$

$$C_z(Y) = C_{z0} + \sum_{n=1} AS_n Y^n \quad (5)$$

where, $X(Y)$ is a SAG amount which is obtained as a function of a coordinate Y extending in the main scanning direction. The SAG amount $X(Y)$ represents a distance between a plane tangential to the anamorphic aspherical surface at the optical axis and a point on a curved line extending along the anamorphic aspherical surface in the main scanning direction and passing the optical axis thereof. Further, $C_z(Y)$ represents a curvature $(1/R_z)$ of an arc extending in the auxiliary scanning direction, the arc is intersecting the curved line at the point whose coordinate is Y. C represents a curvature $(1/r)$ of the anamorphic aspherical surface in the main scanning direction at the optical axis. $\kappa$ represents a conical coefficient, and $AM_n$ is an aspherical coefficient of $n^{th}$ orders. $AS_n$ is an aspherical coefficient of $n^{th}$ order for determining the curvature in the auxiliary scanning direction.

Values of the coefficients for the surface #5 are indicated in TABLE 3.

The aspherical surface defined by a two-dimensional polynomial expression is expressed by:

$$X(Y, Z) = \frac{C(Y^2 + Z^2)}{1 + \sqrt{1 - (1+\kappa)C^2(Y^2 + Z^2)}} + \sum_{n=0} \sum_{m=0} B_{mn} Y^m Z^n \quad (6)$$

where, $X(Y,Z)$ is a SAG amount which is defined by coordinate axes correspond to the main scanning direction (Y axis) and the auxiliary scanning direction (Z axis). $X(Y,Z)$ is a distance between a point $(X,Y)$ on the aspherical surface and a plane tangential to the aspherical surface at the optical axis thereof. C represents a curvature $(1/R_y)$ in the main scanning direction at the optical axis. $\kappa$ represents a conical coefficient, h is a distance from a origin point of the aspherical surface $(h=(Y^2+Z^2)^{1/2})$. $B_{mn}$ is an aspherical coefficient (m is an order as to the main scanning direction, n is an order as to the auxiliary scanning direction). If $B_{mn}$ whose numerical subscript n is an odd number has a value other than zero, the aspherical surface becomes asymmetrical with respect to a plane perpendicular to the auxiliary scanning direction and including the origin point thereof.

Values of the coefficients for the aspherical surface defined by the two-dimensional polynomial expression formed on the compensation lens 51 for the outer beam are indicated in TABLE 4. Values of the coefficients for the aspherical surface defined by the two-dimensional polynomial expression formed on the compensation lens 52 for the inner beam are indicated in TABLE 5.

TABLE 4 surface #8 for the outer beams

| $B_{mn}$ | n = 0 | n = 1 | n = 2 | n = 3 | n = 4 |
|---|---|---|---|---|---|
| m = 0 | — | $6.252 \times 10^{-2}$ | $1.654 \times 10^{-2}$ | $-3.163 \times 10^{-5}$ | $-4.542 \times 10^{-8}$ |
| m = 2 | $-2.529 \times 10^{-5}$ | $-5.921 \times 10^{-7}$ | $-2.926 \times 10^{-7}$ | $3.867 \times 10^{-10}$ | $6.112 \times 10^{-11}$ |
| m = 4 | $8.247 \times 10^{-8}$ | $-1.440 \times 10^{-10}$ | $-8.264 \times 10^{-12}$ | $-4.133 \times 10^{-13}$ | $4.668 \times 10^{-15}$ |
| m = 6 | $-5.177 \times 10^{-12}$ | $9.335 \times 10^{-15}$ | $1.558 \times 10^{-15}$ | $-4.333 \times 10^{-17}$ | 0.00 |
| m = 8 | $2.565 \times 10^{-16}$ | 0.000 | 0.000 | 0.000 | 0.000 |

TABLE 5 surface #11 for the inner beams

| $B_{mn}$ | n = 0 | N = 1 | n = 2 | n = 3 | n = 4 |
|---|---|---|---|---|---|
| m = 0 | — | $3.523 \times 10^{-2}$ | $1.658 \times 10^{-2}$ | $-2.004 \times 10^{-5}$ | $-3.797 \times 10^{-8}$ |
| m = 2 | $-2.692 \times 10^{-5}$ | $-4.576 \times 10^{-7}$ | $-2.933 \times 10^{-7}$ | $2.130 \times 10^{-9}$ | $7.696 \times 10^{-12}$ |
| m = 4 | $8.239 \times 10^{-8}$ | $-6.120 \times 10^{-11}$ | $-1.323 \times 10^{-11}$ | $-1.552 \times 10^{-13}$ | $1.316 \times 10^{-15}$ |
| m = 6 | $-4.884 \times 10^{-12}$ | $4.911 \times 10^{-15}$ | $1.8123 \times 10^{-15}$ | $-6.438 \times 10^{-17}$ | 0.00 |
| m = 8 | $2.341 \times 10^{-16}$ | 0.000 | 0.000 | 0.000 | 0.000 |

TABLE 3 surface #5
$\kappa = 0.000$

| | | | |
|---|---|---|---|
| $AM_1 =$ | 0.00 | $AS_1 =$ | $6.44 \times 10^{-6}$ |
| $AM_2 =$ | $-1.49 \times 10^{-5}$ | $AS_2 =$ | $7.57 \times 10^{-6}$ |
| $AM_3 =$ | 0.00 | $AS_3 =$ | $1.80 \times 10^{-8}$ |
| $AM_4 =$ | $1.53 \times 10^{-6}$ | $AS_4 =$ | $-1.71 \times 10^{-9}$ |
| $AM_5 =$ | 0.00 | $AS_5 =$ | $-1.34 \times 10^{-11}$ |
| $AM_6 =$ | $1.86 \times 10^{-10}$ | $AS_6 =$ | $1.01 \times 10^{-12}$ |

Figure 6A:
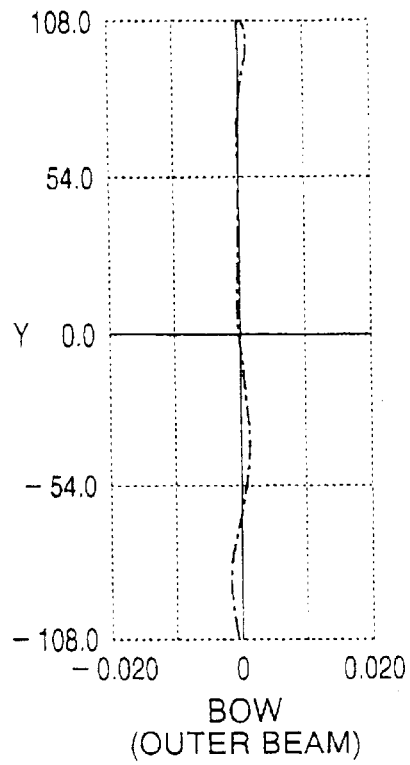
FIG. 6A is a graph showing a bow as to the outer beam in the first example.
Figure 6B:
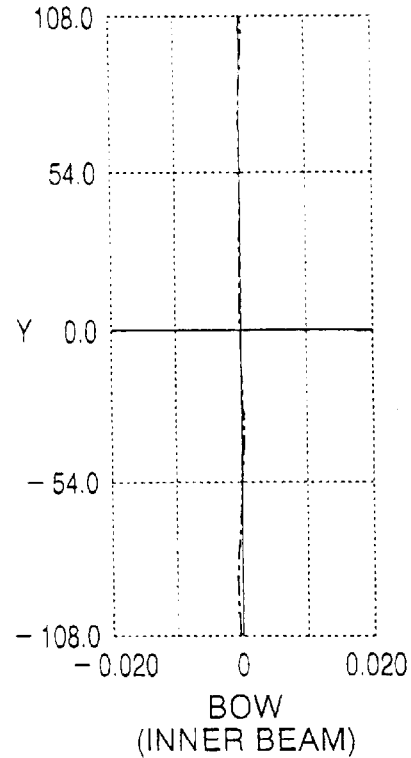
FIG. 6B is a graph showing the bow as to the inner beam in the first example.
Figure 6C:
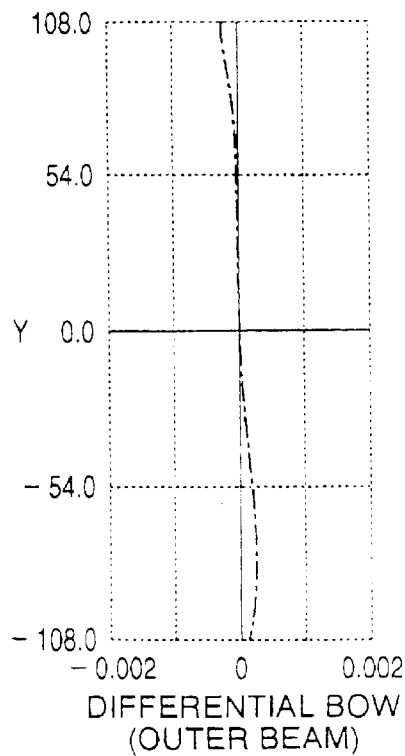
FIG. 6C is a graph showing a differential bow with regard to outer beams impinging on the same photoconductive drum in the first example.
Figure 6D:
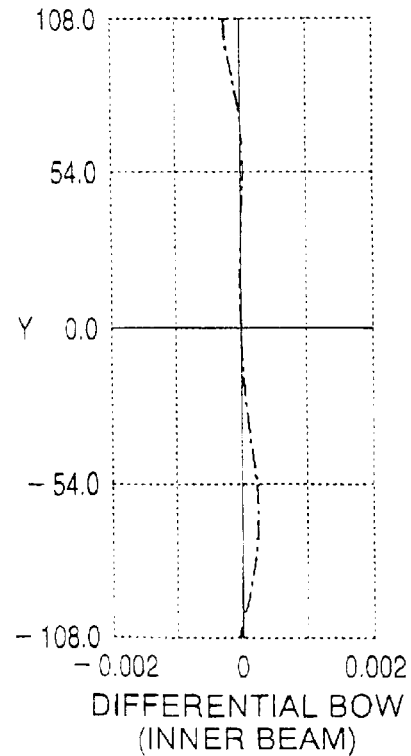
FIG. 6D is a graph showing the differential bow with regard to inner beams impinging on the same photoconductive drum in the first example.

FIGS. 6A–10B are graphs showing aberrations of the scanning optical system 110. FIG. 6A is a graph showing a curve of a scanning line (i.e., a bow) with regard to the outer beam L1. FIG. 6B is a graph showing a curve of a scanning line (i.e., a bow) with regard to the inner beam L2. FIG. 6C is a graph showing a differential bow with regard to the outer beams impinging on the same photoconductive drum 61 (i.e., a difference between bows of outer beams L1 and L5). FIG. 6D is a graph showing a differential bow with regard to the inner beams impinging on the same photoconductive drum 62 (i.e., a difference between bows of inner beams L2 and L6).

Figure 7A:
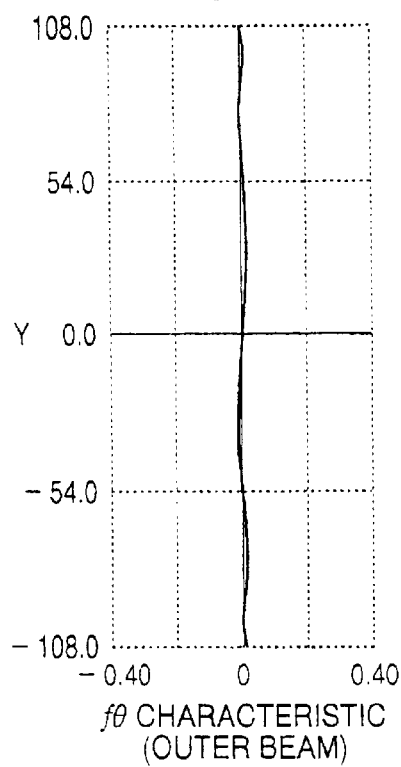
FIG. 7A is a graph showing a fθ characteristic with regard to the outer beam in the first example.
Figure 7B:
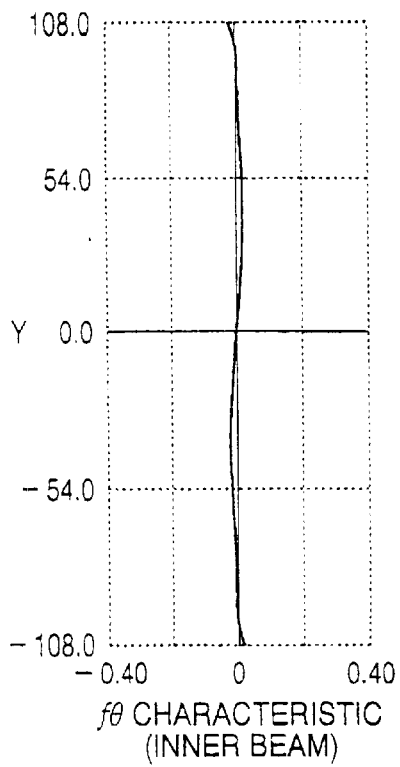
FIG. 7B is a graph showing a fθ characteristic with regard to the inner beam in the first example.
Figure 8A:
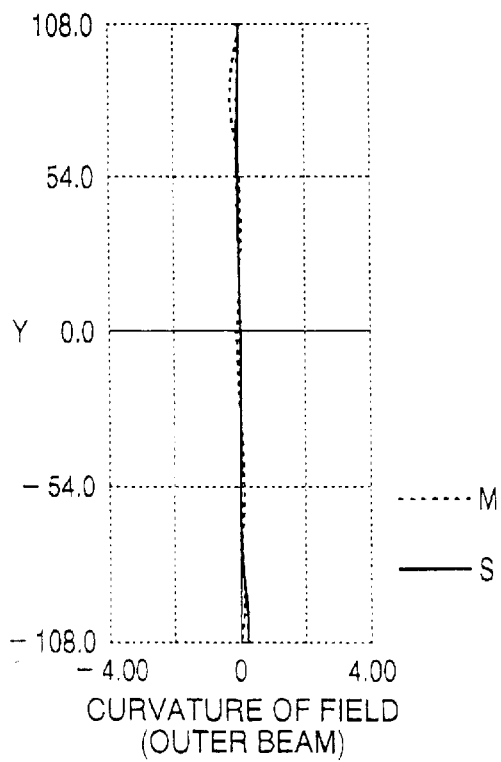
FIG. 8A is a graph showing curvature of field as to the outer beam in the first example.
Figure 8B:
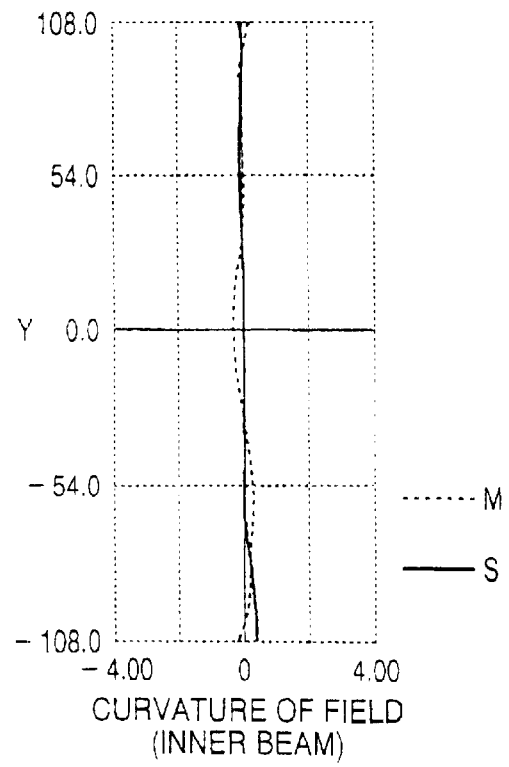
FIG. 8B is a graph showing curvature of field as to the inner beam In the first example.
Figure 9A:
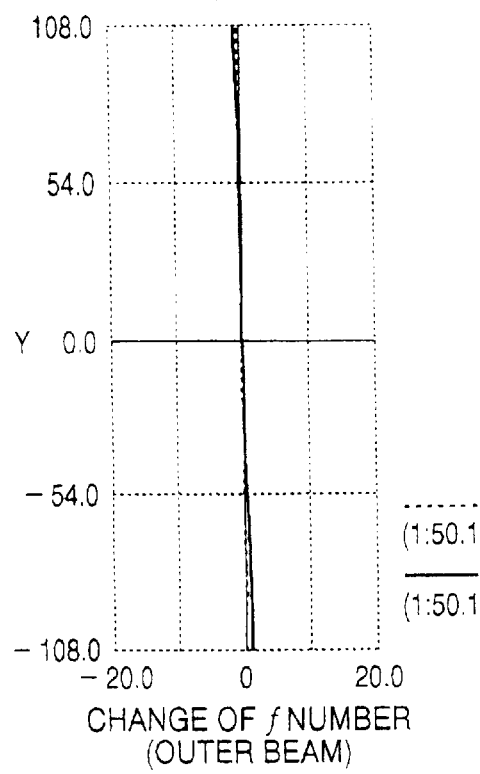
FIG. 9A is a graph showing a change of f number with regard to the outer beam in the first example.
Figure 9B:
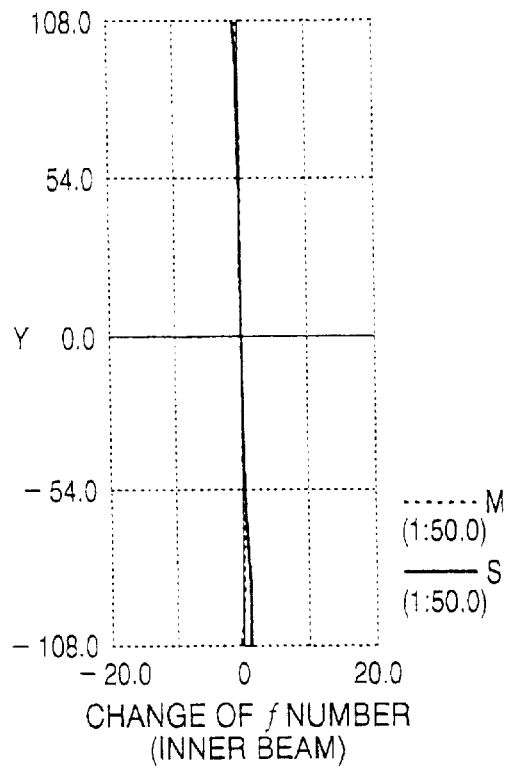
FIG. 9B is a graph showing a change of f number with regard to the inner beam in the first example.

FIGS. 7A and 7B are graphs showing fθ characteristics with regard to the outer beam and the inner beam, respectively. FIG. 8A is a graph showing curvature of field with regard to the outer beam. FIG. 8B is a graph showing curvature of field with regard to the inner beam. FIG. 9A is a graph showing a change of f number with regard to the outer beam. FIG. 9B is a graph showing a change of f number with regard to the inner beam. In each of the FIGS. 8A, 8B, 9A and 9B, a broken line M and a solid line S show characteristics as to the main scanning direction and the auxiliary scanning direction, respectively.

Figure 10A:
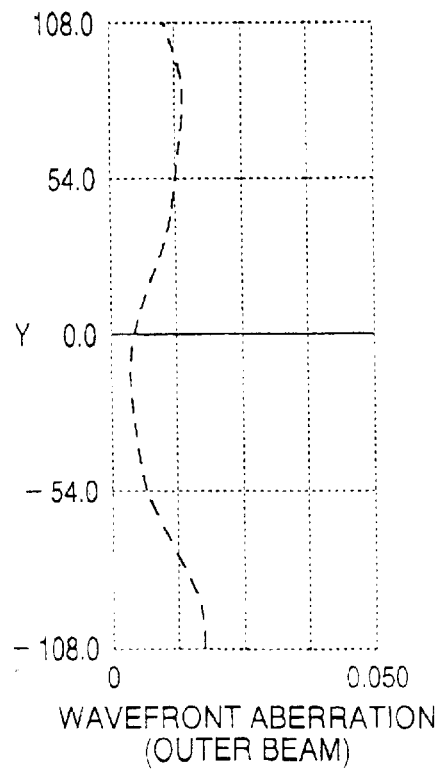
FIG. 10A is a graph showing a wavefront aberration with regard to an optical system through which the outer beam passes in the first example.
Figure 10B:
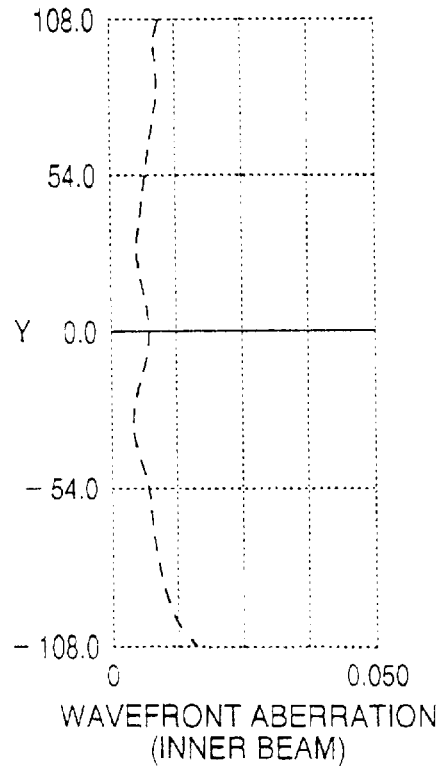
FIG. 10B is a graph showing a wavefront aberration with regard to an optical system through which the inner beam passes in the first example.

FIG. 10A is a graph showing a wavefront aberration with regard to an optical system through which the outer beam passes. FIG. 10B is a graph showing a wavefront aberration with regard to an optical system through which the inner beam passes. In each graph, the longitudinal axis represents an image height (unit: mm), and the horizontal axis represents an amount of aberration. The unit of the amount of aberration in each of FIGS. 6A–6D, 7A, 7B, 8A, 8B is a millimeter. The unit of the amount of aberration in each of FIGS. 9A and 9B is a percent. The unit of the amount of aberration in each of FIGS. 10A and 10B is a wavelength.

FIGS. 11A–11C are graphs showing wavefront aberrations of the scanning optical system 110 with regard to the outer beam L1. FIGS. 12A–12C are graphs showing wavefront aberrations of the scanning optical system 110 with regard to the inner beam L2. Graphs of the FIG. 11A and FIG. 12A represent aberrations at image height Y=108 mm on the photoconductive drums 61 and 62, respectively. Graphs of the FIG. 11B and FIG. 12B represent aberrations at image height Y=0 mm on the photoconductive drums 61 and 62, respectively. Graphs of the FIG. 11C and FIG. 12C represent aberrations at image height Y=−108 mm on the photoconductive drums 61 and 62, respectively. In each graph of the FIGS. 11A–11C and 12A–12C, ends on the longitudinal axis correspond to distances of ±0.2λ from the origin point.

As shown in FIGS. 6A–10B, the scanning optical system 110 according to the first example can compensate for both of a bow and a differential bow while satisfying essential characteristics for a scanning optical system such as a fθ characteristic, correction of a curvature of field. Further, as shown in FIGS. 11A–12C, according to the first example, a fluctuation of a wavefront is sufficiently suppressed.

SECOND EXAMPLE

Figure 13:
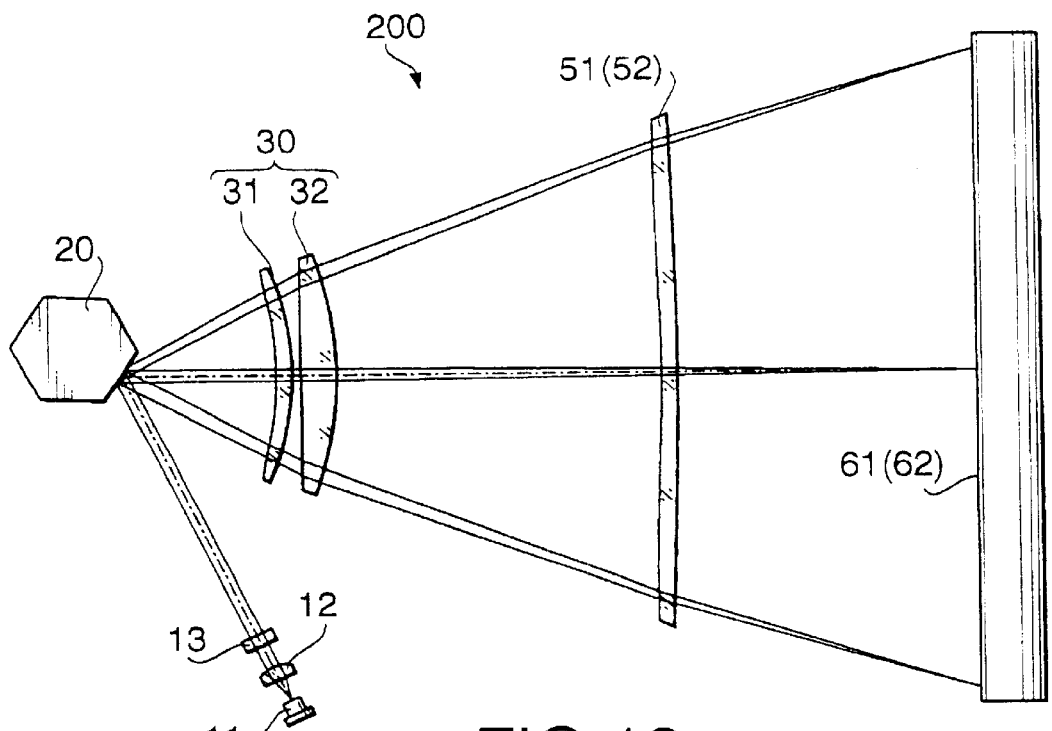
FIG. 13 is a developed view of a scanning optical system according to a second example viewed from a line parallel with a rotational axis of the polygonal mirror.
Figure 14:
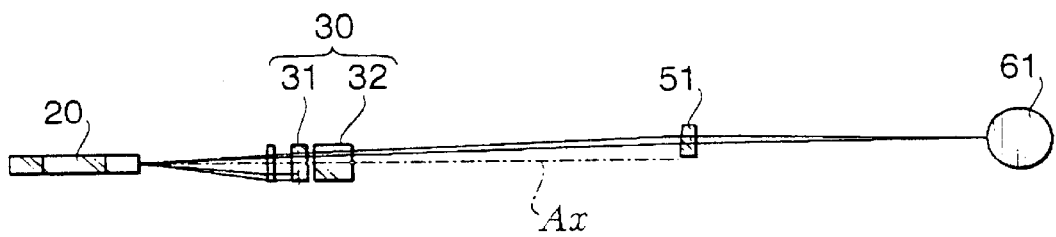
FIG. 14 is a developed view of the scanning optical system of the second example with regard to the outer beam viewed from a line parallel with the main scanning direction.
Figure 15:
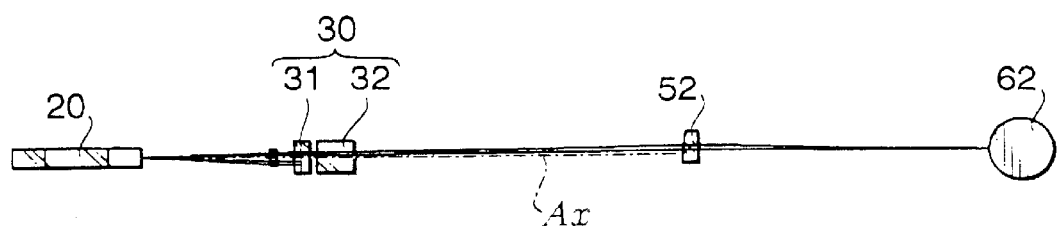
FIG. 15 is a developed view of the scanning optical system of the second example with regard to the inner beam viewed from a line parallel with the main scanning direction.

FIGS. 13–15 show a scanning optical system 200 according to a second example. FIG. 13 is a developed view of the scanning optical system 200 viewed from a line parallel with the rotational axis of the polygonal mirror 20. FIG. 14 is a developed view of the scanning optical system 200 with regard to the outer beam L1 viewed from a line parallel with the main scanning direction. FIG. 15 is a developed view of the scanning optical system 200 with regard to the inner beam L2 viewed from a line parallel with the main scanning direction.

In FIGS. 13–15, to elements which are similar to those in FIG. 1, the same reference numbers are assigned, and the detailed description thereof will not be repeated. As shown in FIG. 13, in the scanning optical system 200, the scanning lens 30 includes the first lens 31 and the second lens 32. Each of the first lens 31, second lens 32, and the compensation lenses 51–54 is made of plastic.

TABLE 6 indicates a numerical structure of the scanning optical system 200 from the light incident side of the cylindrical lens 13 to the photoconductive drum. In TABLE 6, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51(54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam. Each symbol in TABLE 6 has the same meaning as that in TABLE 1.

TABLE 6 focal length = 200 mm
scanning width = 216 mm
design wavelength = 780 nm
incident angle with respect to polygonal mirror
65° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | — | 2.50 | — | — |
| #6 | ∞ | — | 11.50 | 1.48617 | 0.00 |
| #7 | −100.00 | −100.00 | 102.50 | — | — |
| #8 | −653.00 | — | 5.00 | 1.48617 | 6.00 |
| #9 | −1800.00 | — | 92.02 | — | — |
| #10 | ∞ | — | 0.00 | — | 5.55 |
| #11 | −648.40 | — | 5.00 | 1.48617 | 2.50 |
| #12 | −1800.00 | — | 92.07 | — | — |
| #13 | ∞ | — | 0.00 | — | 1.89 |

In TABLE 6, surface #1 is a cylindrical surface, surfaces #2 and #3 are planar surfaces, surface #4 is a rotationally symmetrical aspherical surface, and surface #5 is a spherical surface. Surface #6 is a planar surface, surface #7 is an anamorphic aspherical surface, surface #8 and #11 are aspherical surfaces defined by two-dimensional polynomial expressions, surfaces #9 and #12 are aspherical surfaces.

Conical coefficients and aspherical coefficients for the surface #4 are indicated in TABLE 7.

TABLE 7

| κ | 0.00 |
|---|---|
| $A_4$ | $1.16 \times 10^{-6}$ |
| $A_6$ | $-1.25 \times 10^{-10}$ |

Values of the coefficients for the surface #7 are indicated in TABLE 8.

TABLE 8 surface #7
κ = 0.000

| $AM_1 =$ | 0.00 | $AS_1 =$ | $4.64 \times 10^{-6}$ |
|---|---|---|---|
| $AM_2 =$ | $-6.13 \times 10^{-6}$ | $AS_2 =$ | $2.94 \times 10^{-6}$ |
| $AM_3 =$ | 0.00 | $AS_3 =$ | $6.85 \times 10^{-9}$ |
| $AM_4 =$ | $8.71 \times 10^{-7}$ | $AS_4 =$ | $-1.32 \times 10^{-9}$ |
| $AM_5 =$ | 0.00 | $AS_5 =$ | $-3.56 \times 10^{-12}$ |
| $AM_6 =$ | $-4.72 \times 10^{-11}$ | $AS_6 =$ | $-3.34 \times 10^{-13}$ |

Values of the coefficients for the surface #8 of the compensation lens 51 and the surface #11 of the compensation lens 52 are indicated in TABLE 9 and TABLE 10, respectively.

TABLE 9 surface #8 for the outer beams

| $B_{mn}$ | n = 0 | n = 1 | n = 2 | n = 3 | n = 4 |
|---|---|---|---|---|---|
| m = 0 | — | $7.245 \times 10^{-2}$ | $1.645 \times 10^{-2}$ | $-1.233 \times 10^{-5}$ | $-2.100 \times 10^{-7}$ |
| m = 2 | $-9.708 \times 10^{-6}$ | $-9.270 \times 10^{-7}$ | $-3.044 \times 10^{-7}$ | $-9.591 \times 10^{-10}$ | $-1.773 \times 10^{-11}$ |
| m = 4 | $1.111 \times 10^{-7}$ | $-1.791 \times 10^{-10}$ | $-1.080 \times 10^{-11}$ | $-2.247 \times 10^{-13}$ | $-5.992 \times 10^{-15}$ |
| m = 6 | $-6.350 \times 10^{-12}$ | $1.311 \times 10^{-14}$ | $1.753 \times 10^{-15}$ | $-5.836 \times 10^{-17}$ | $-1.122 \times 10^{-19}$ |
| m = 8 | $2.293 \times 10^{-16}$ | 0.000 | 0.000 | 0.000 | 0.000 |

TABLE 10 surface #11 for the inner beams

| $B_{mn}$ | n = 0 | n = 1 | n = 2 | n = 3 | n = 4 |
|---|---|---|---|---|---|
| m = 0 | — | $3.940 \times 10^{-2}$ | $1.651 \times 10^{-2}$ | $-1.372 \times 10^{-5}$ | $-1.282 \times 10^{-7}$ |
| m = 2 | $1.912 \times 10^{-6}$ | $-5.986 \times 10^{-7}$ | $-2.982 \times 10^{-7}$ | $2.226 \times 10^{-9}$ | $-1.987 \times 10^{-11}$ |
| m = 4 | $1.116 \times 10^{-7}$ | $-7.569 \times 10^{-11}$ | $1.707 \times 10^{-11}$ | $-1.593 \times 10^{-13}$ | $-8.401 \times 10^{-15}$ |
| m = 6 | $-6.244 \times 10^{-12}$ | $6.436 \times 10^{-15}$ | $2.136 \times 10^{-15}$ | $-5.594 \times 10^{-17}$ | $-1.385 \times 10^{-19}$ |
| m = 8 | $2.158 \times 10^{-16}$ | 0.000 | 0.000 | 0.000 | 0.000 |

Figure 16A:
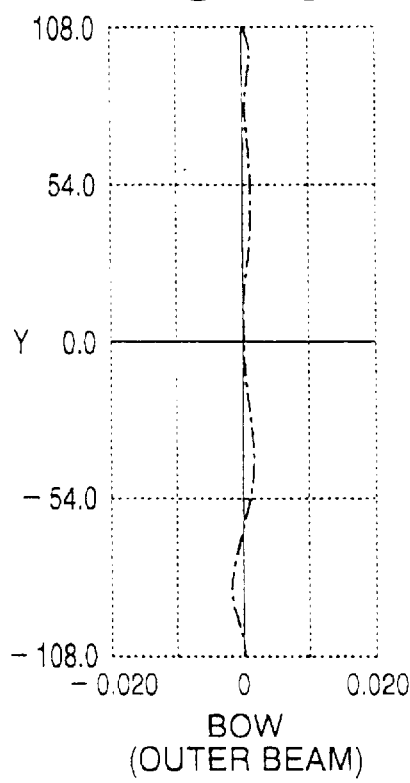
FIG. 16A is a graph showing a bow as to the outer beam in the second example.
Figure 16B:
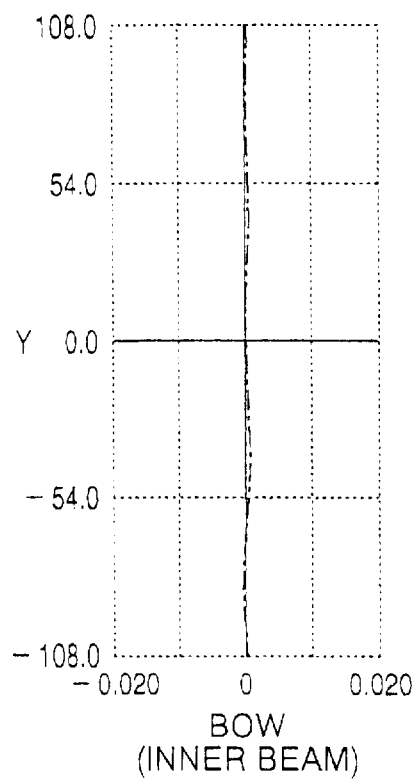
FIG. 16B is a graph showing the bow as to the inner beam in the second example.
Figure 16C:
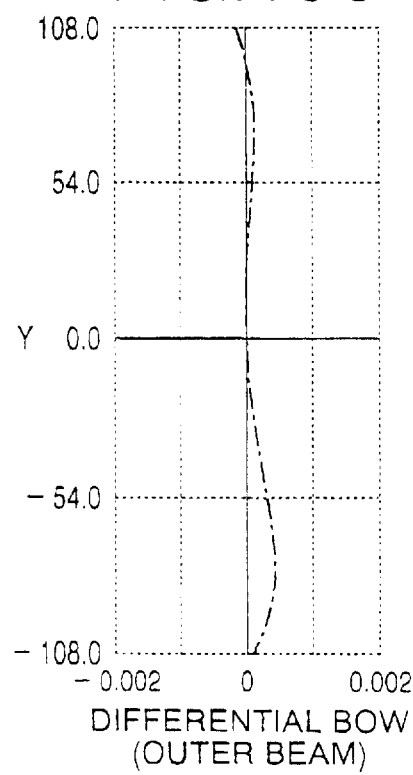
FIG. 16C is a graph showing a differential bow with regard to outer beams impinging on the same photoconductive drum in the second example.
Figure 16D:
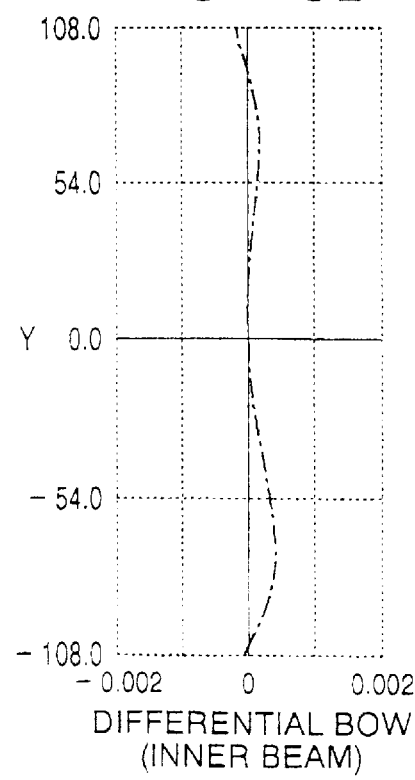
FIG. 16D is a graph showing the differential bow with regard to inner beams impinging on the same photoconductive drum in the second example.

FIGS. 16A–20B are graphs showing aberrations of the scanning optical system 200. FIG. 16A is a graph showing a curve of a scanning line (i.e., a bow), with regard to the outer beam L1. FIG. 16B is a graph showing a curve of a scanning line (i.e., a bow) with regard to the inner beam L2. FIG. 16C is a graph showing a differential bow with regard to the outer beams (i.e., a difference between bows of outer beams L1 and L5). FIG. 16D is a graph showing a differential bow with regard to the inner beams (i.e., a difference between bows of inner beams L2 and L6).

Figure 17A:
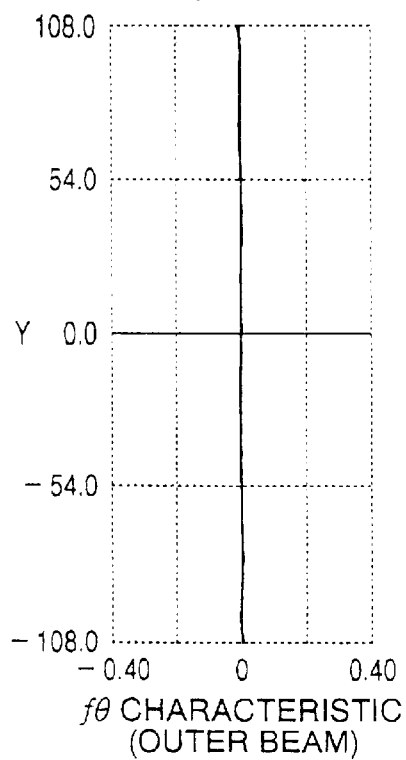
FIG. 17A is a graph showing a fθ characteristic with regard to the outer beam in the second example.
Figure 17B:
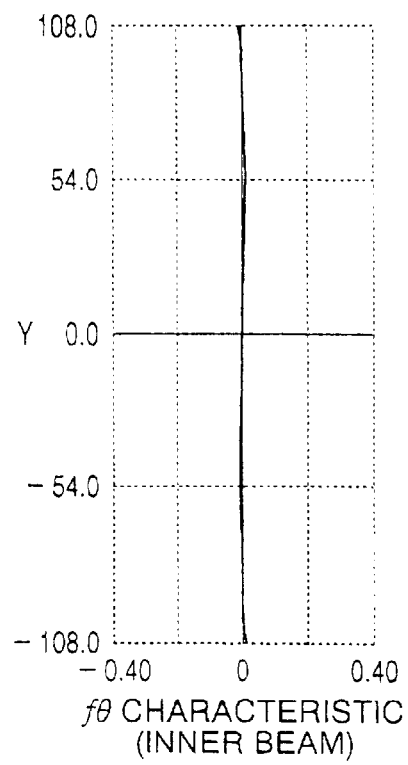
FIG. 17B is a graph showing a fθ characteristic with regard to the inner beam in the second example.
Figure 18A:
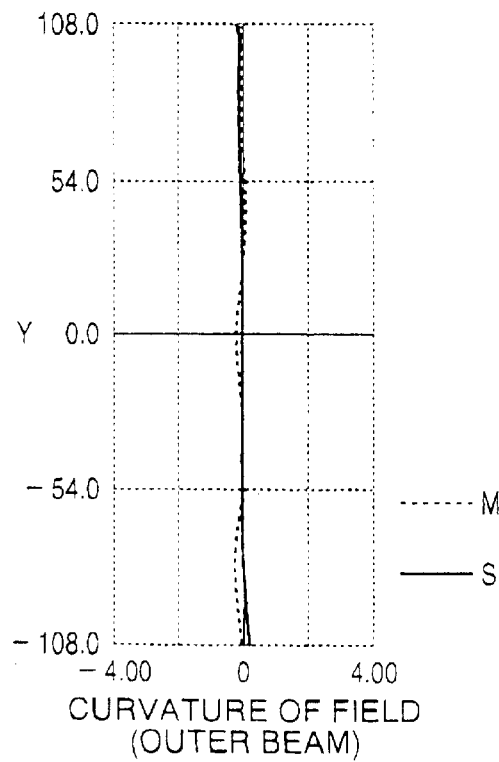
FIG. 18A is a graph showing curvature of field as to the outer beam in the second example.
Figure 18B:
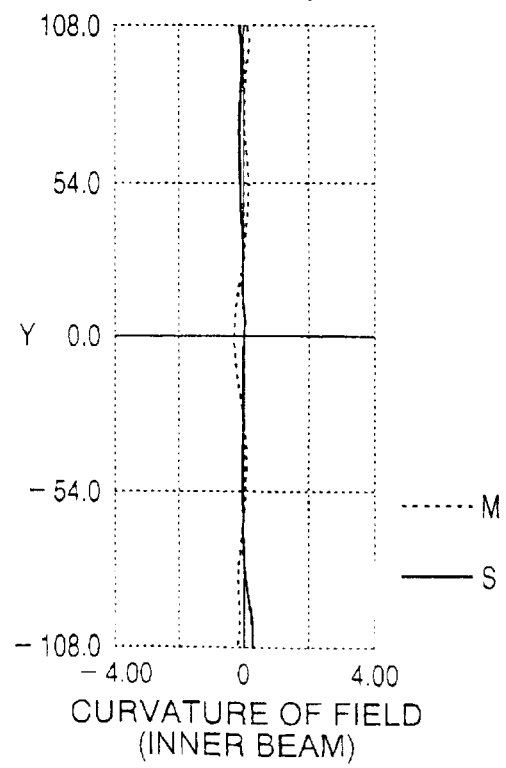
FIG. 18B is a graph showing curvature of field as to the inner beam in the second example.
Figure 19A:
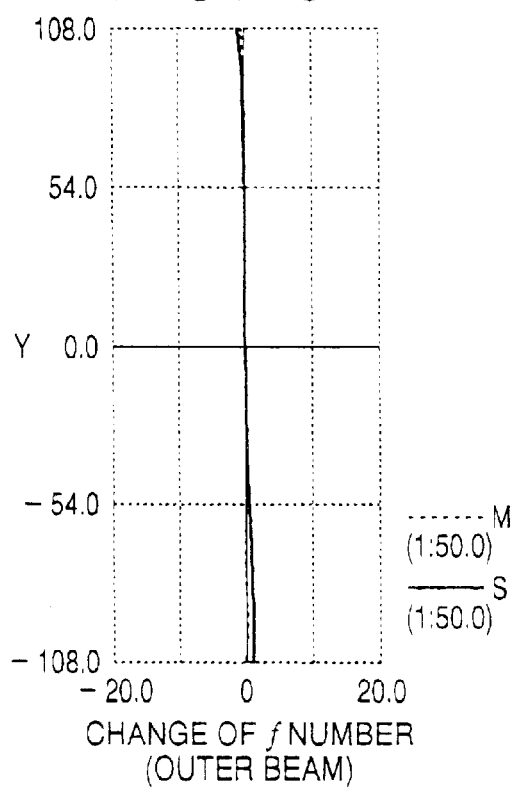
FIG. 19A is a graph showing a change of f number with regard to the outer beam in the second example.
Figure 19B:
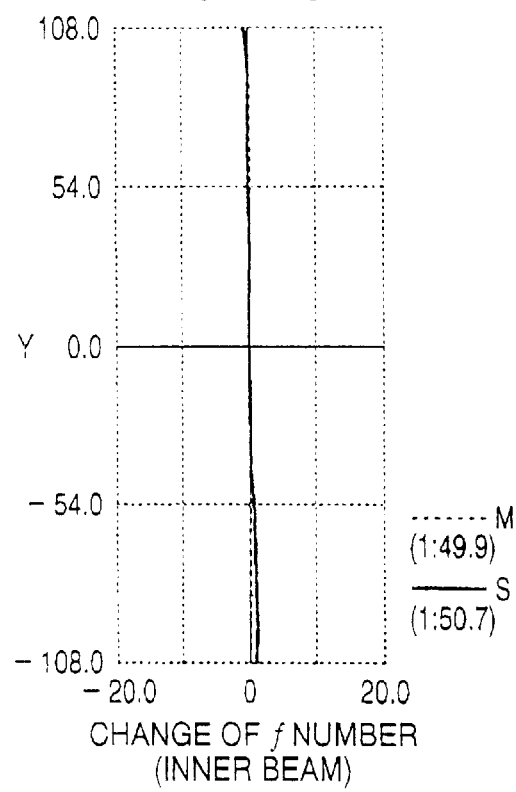
FIG. 19B is a graph showing a change of f number with regard to the inner beam in the second example.

FIGS. 17A and 17B are graphs showing fθ characteristics with regard to the outer beam and the inner beam, respectively. FIG. 18A is a graph showing curvature of field with regard to the outer beam. FIG. 18B is a graph showing curvature of field with regard to the inner beam. FIG. 19A is a graph showing a change of f number with regard to the outer beam. FIG. 19B is a graph showing a change of f number with regard to the inner beam. In each of the FIGS. 18A, 18B, 19A and 19B, a broken line M and a solid line S show characteristics as to the main scanning direction and the auxiliary scanning direction, respectively.

Figure 20A:
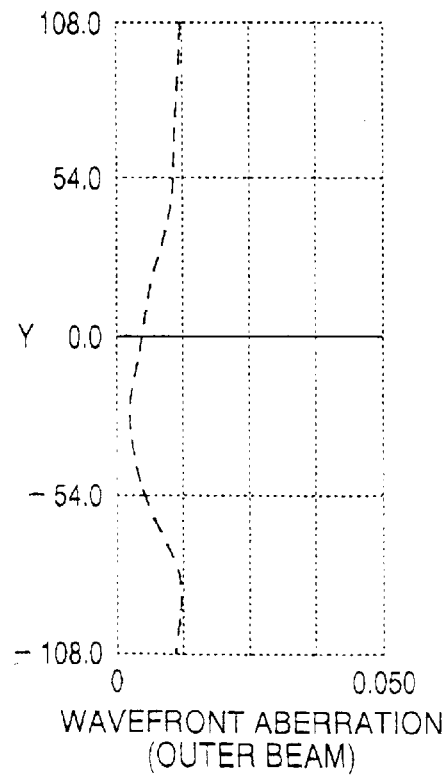
FIG. 20A is a graph showing a wavefront aberration with regard to an optical system through which the outer beam passes in the second example.
Figure 20B:
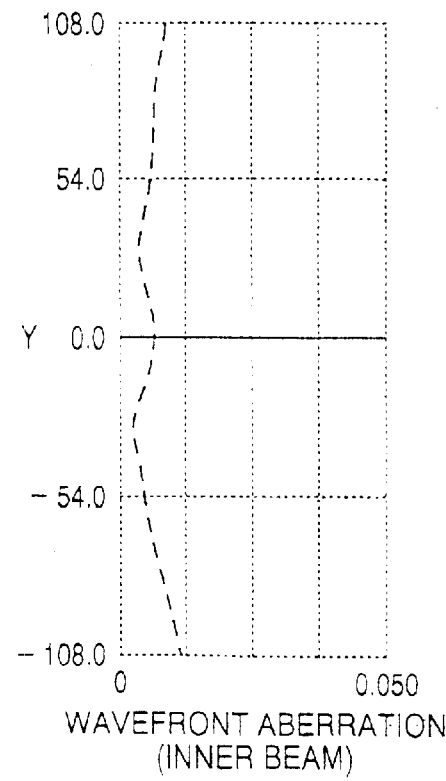
FIG. 20B is a graph showing a wavefront aberration with regard to an optical system through which the inner beam passes in the second example.

FIG. 20A is a graph showing a wavefront aberration with regard to an optical system through which the outer beam passes. FIG. 20B is a graph showing a wavefront aberration with regard to an optical system through which the inner beam passes. In each graph, the longitudinal axis represents an image height (unit: mm), and the horizontal axis represents an amount of aberration. The unit of the amount of aberration in each of FIGS. 16A–16D, 17A, 17B, 18A, 18B is a millimeter. The unit of the amount of aberration in each of FIGS. 19A and 19B is a percent. The unit of the amount of aberration in each of FIGS. 20A and 20B is a wavelength.

FIGS. 21A–21C are graphs showing wavefront aberrations of the scanning optical system 200 with regard to the outer beam L1. FIGS. 22A–22C are graphs showing wavefront aberrations of the scanning optical system 200 with regard to the inner beam L2. Graphs of the FIG. 21A and FIG. 22A represent aberrations at image height Y=108 mm on the photoconductive drums 61 and 62, respectively. Graphs of the FIG. 21B and FIG. 22B represent aberrations at image height Y=0 mm on the photoconductive drums 61 and 62, respectively. Graphs of the FIG. 21C and FIG. 22C represent aberrations at image height Y=−108 mm on the photoconductive drums 61 and 62, respectively. In each graph of the FIGS. 21A–21C and 22A–22C, ends on the longitudinal axis correspond to distances of ±0.2λ from the origin point.

As shown in FIGS. 16A–20B, the scanning optical system 200 according to the second example can compensate for both of a bow and a differential bow while satisfying essential characteristics for a scanning optical system such as a fθ characteristic, correction of a curvature of field. Further, as shown in FIGS. 21A–22C, according to the second example, a fluctuation of a wavefront is sufficiently suppressed.

THIRD EXAMPLE

Figure 23:
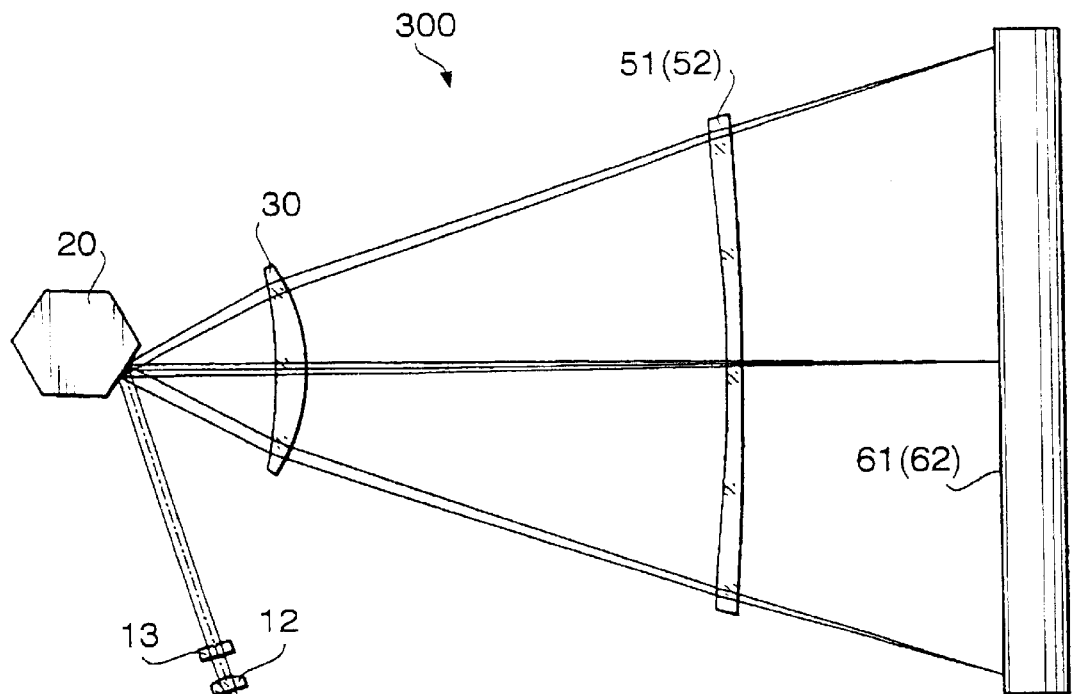
FIG. 23 is a developed view of a scanning optical system according to a third example viewed from a line parallel with a rotational axis of the polygonal mirror.
Figure 24:
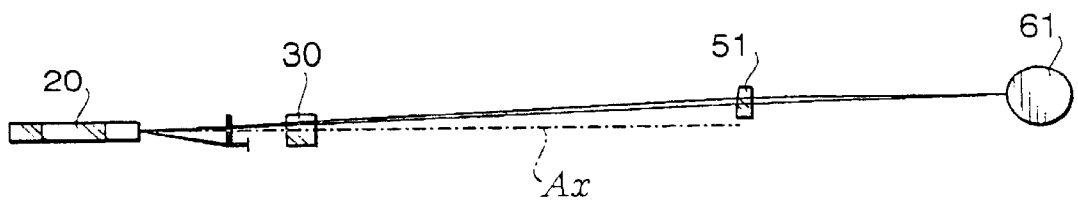
FIG. 24 is a developed view of the scanning optical system of the third example with regard to the outer beam viewed from a line parallel with the main scanning direction.
Figure 25:
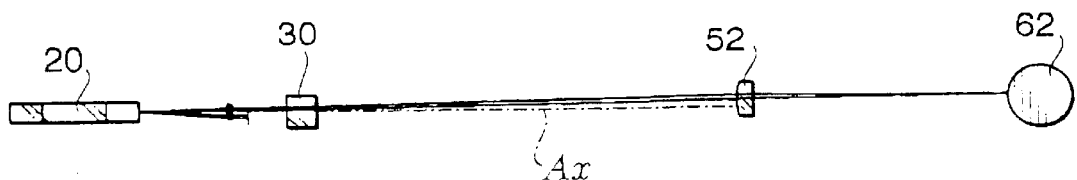
FIG. 25 is a developed view of the scanning optical system of the third example with regard to the inner beam viewed from a line parallel with the main scanning direction.

FIGS. 23–25 show a scanning optical system 300 according to a third example. FIG. 23 is a developed view of the scanning optical system 300 viewed from a line parallel with the rotational axis of the polygonal mirror 20. FIG. 24 is a developed view of the scanning optical system 300 with regard to the outer beam L1 viewed from a line parallel with the main scanning direction. FIG. 25 is a developed view of the scanning optical system 300 with regard to the inner beam L2 viewed from a line parallel with the main scanning direction.

In FIGS. 23–25, to elements which are similar to those in FIG. 1, the same reference numbers are assigned, and the detailed description thereof will not be repeated. As shown in FIG. 23, in the scanning optical system 300, the scanning lens 30 is a single lens. Each of the scanning lens 30 and the compensation lenses 51–54 is made of plastic.

TABLE 11 indicates a numerical structure of the scanning optical system 300 from the light incident side of the cylindrical lens 13 to the photoconductive drum. In TABLE 11, surfaces #1 and #2 represents surfaces of the cylindrical lens 13, and surface #3 is the reflection surface of the polygonal mirror 20, surfaces #4 and #5 represent the scanning lens 30. Surfaces #6 and #7 represent the compensation lens 51(54) for the outer beam. Surface #8 represents the photoconductive drum 61(64) for the outer beam. Surfaces #9 and #10 represent the compensation lens 52(53) for the inner beam. Surface #11 represents the photoconductive drum 62(63) for the inner beam. Each symbol in TABLE 11 has the same meaning as that in TABLE 1.

TABLE 11 focal length = 200 mm
scanning width = 216 mm
design wavelength = 780 nm
incident angle with respect to polygonal mirror
74.0° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 47.50 | — | 0.00 |
| #4 | −175.00 | — | 9.00 | 1.48617 | 0.00 |

TABLE 11-continued focal length = 200 mm
scanning width = 216 mm
design wavelength = 780 nm
incident angle with respect to polygonal mirror
74.0° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #5 | −65.00 | −100.00 | 132.50 | — | — |
| #6 | −427.90 | — | 5.00 | 1.48617 | 8.00 |
| #7 | −1200.00 | — | 79.37 | — | — |
| #8 | ∞ | — | 0.00 | — | 9.93 |
| #9 | −427.00 | — | 5.00 | 1.48617 | 2.50 |
| #10 | −1200.00 | — | 79.73 | — | — |
| #11 | ∞ | — | 0.00 | — | 3.50 |

In TABLE 11, surface #1 is a cylindrical surface, surfaces #2 and #3 are planar surfaces, surface #4 is a spherical surface, and surface #5 is an anamorphic aspherical surface. Surfaces #6 and #9 are aspherical surfaces defined by two-dimensional polynomial expressions, surfaces #7 and #10 are spherical surfaces.

Values of the coefficients for the surface #5 are indicated in TABLE 12.

TABLE 8 surface #5
$\kappa = 0.000$

| $AM_1 =$ | 0.00 | $AS_1 =$ | $8.62 \times 10^{-6}$ |
|---|---|---|---|
| $AM_2 =$ | $-8.21 \times 10^{-6}$ | $AS_2 =$ | $3.49 \times 10^{-6}$ |
| $AM_3 =$ | 0.00 | $AS_3 =$ | $2.21 \times 10^{-8}$ |
| $AM_4 =$ | $1.56 \times 10^{-7}$ | $AS_4 =$ | $-2.90 \times 10^{-9}$ |
| $AM_5 =$ | 0.00 | $AS_5 =$ | $-1.82 \times 10^{-11}$ |
| $AM_6 =$ | $1.05 \times 10^{-11}$ | $AS_6 =$ | $5.76 \times 10^{-13}$ |

Values of the coefficients for the surface #6 of the compensation lens 51 and the surface #9 of the compensation lens 52 are indicated in TABLE 13 and TABLE 14, respectively.

TABLE 9 surface #6 for the outer beams

| $B_{mn}$ | n = 0 | n = 1 | n = 2 | n = 3 | n = 4 |
|---|---|---|---|---|---|
| m = 0 | — | $3.645 \times 10^{-2}$ | $1.832 \times 10^{-2}$ | $6.407 \times 10^{-5}$ | $-2.644 \times 10^{-6}$ |
| m = 2 | $4.298 \times 10^{-8}$ | $1.174 \times 10^{-6}$ | $-3.640 \times 10^{-7}$ | $-2.420 \times 10^{-8}$ | $-6.244 \times 10^{-10}$ |
| m = 4 | $8.925 \times 10^{-8}$ | $-2.401 \times 10^{-10}$ | $1.943 \times 10^{-11}$ | $3.490 \times 10^{-13}$ | $-3.477 \times 10^{-14}$ |
| m = 6 | $-2.041 \times 10^{-12}$ | $9.635 \times 10^{-15}$ | $-1.395 \times 10^{-15}$ | $2.677 \times 10^{-16}$ | $-1.385 \times 10^{-18}$ |
| m = 8 | $1.502 \times 10^{-18}$ | 0.000 | 0.000 | 0.000 | 0.000 |

TABLE 14 surface #9 for the inner beams

| $B_{mn}$ | n = 0 | n = 1 | n = 2 | n = 3 | n = 4 |
|---|---|---|---|---|---|
| m = 0 | — | $1.619 \times 10^{-8}$ | $1.486 \times 10^{-2}$ | $-1.607 \times 10^{-5}$ | $-1.622 \times 10^{-6}$ |
| m = 2 | $-1.279 \times 10^{-6}$ | $6.042 \times 10^{-7}$ | $-3.260 \times 10^{-7}$ | $-1.056 \times 10^{-10}$ | $-6.600 \times 10^{-10}$ |
| m = 4 | $9.463 \times 10^{-8}$ | $-7.814 \times 10^{-11}$ | $8.576 \times 10^{-13}$ | $1.797 \times 10^{-12}$ | $-2.971 \times 10^{-14}$ |
| m = 6 | $-2.912 \times 10^{-12}$ | $2.457 \times 10^{-15}$ | $7.123 \times 10^{-16}$ | $-3.658 \times 10^{-16}$ | $-1.239 \times 10^{-18}$ |
| m = 8 | $5.821 \times 10^{-17}$ | 0.000 | 0.000 | 0.000 | 0.000 |

FIGS. 26A–30B are graphs showing aberrations of the scanning optical system 300. FIG. 26A is a graph showing a curve of a scanning line (i.e., a bow) with regard to the outer beam L1. FIG. 26B is a graph showing a curve of a scanning line (i.e., a bow) with regard to the inner beam L2. FIG. 26C is a graph showing a differential bow with regard to the outer beams (i.e., a difference between bows of outer beams L1 and L5). FIG. 26D is a graph showing a differential bow with regard to the inner beams (i.e., a difference between bows of inner beams L2 and L6).

Figure 27A:
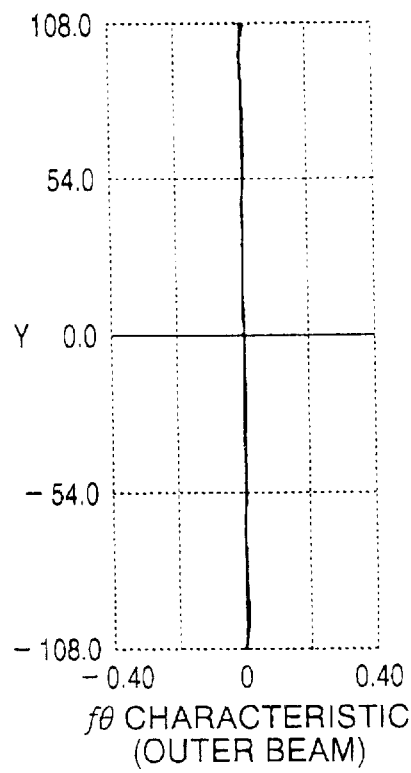
FIG. 27A is a graph showing a fθ characteristic with regard to the outer beam in the third example.
Figure 27B:
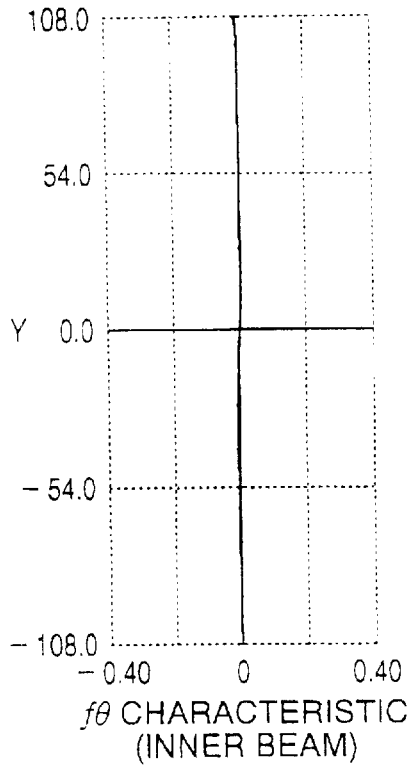
FIG. 27B is a graph showing a fθ characteristic with regard to the inner beam in the third example.
Figure 28A:
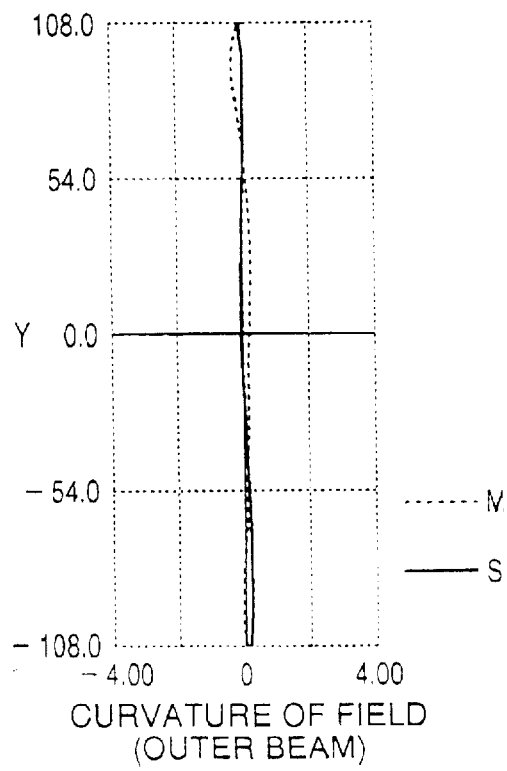
FIG. 28A is a graph showing curvature of field as to the outer beam in the third example.
Figure 28B:
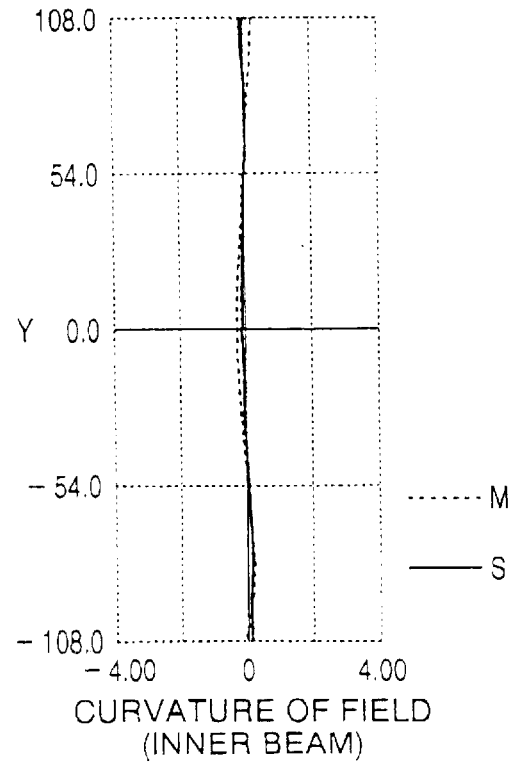
FIG. 28B is a graph showing curvature of field as to the inner beam in the third example.
Figure 29A:
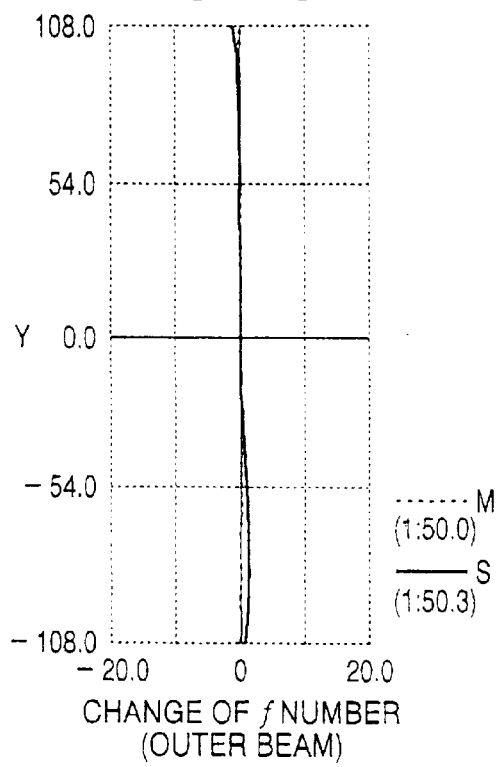
FIG. 29A is a graph showing a change of f number with regard to the outer beam in the third example.
Figure 29B:
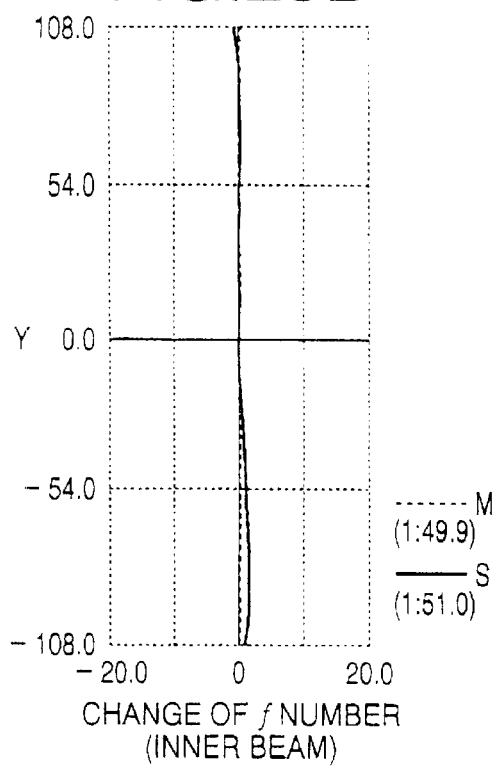
FIG. 29B is a graph showing a change of f number with regard to the inner beam in the third example.

FIGS. 27A and 27B are graphs showing fθ characteristics with regard to the outer beam and the inner beam, respectively. FIG. 28A is a graph showing curvature of field with regard to the outer beam. FIG. 28B is a graph showing curvature of field with regard to the inner beam. FIG. 29A is a graph showing a change of f number with regard to the outer beam. FIG. 29B is a graph showing a change of f number with regard to the inner beam. In each of the FIGS. 28A, 28B, 29A and 29B, a broken line M and a solid line S show characteristics as to the main scanning direction and the auxiliary scanning direction, respectively.

Figure 30A:
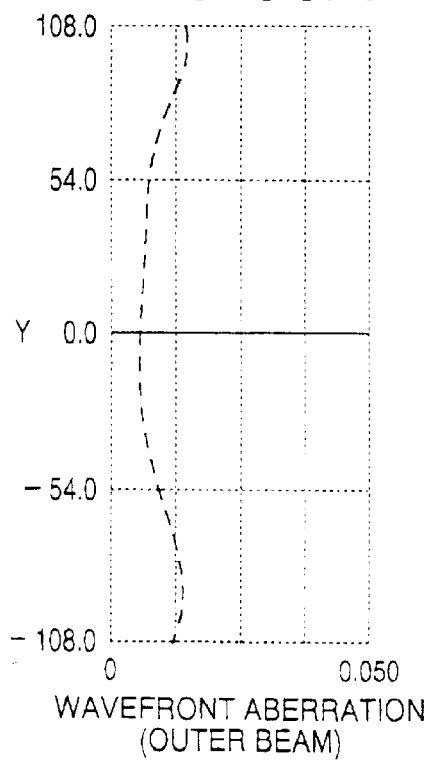
FIG. 30A is a graph showing a wavefront aberration with regard to an optical system through which the outer beam passes in the third example.
Figure 30B:
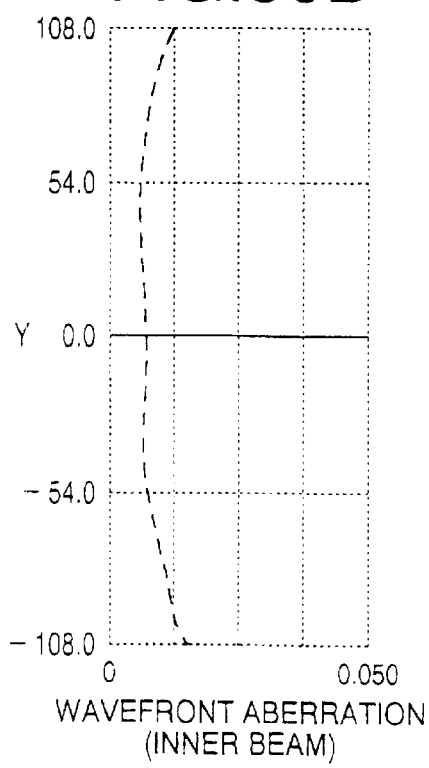
FIG. 30B is a graph showing a wavefront aberration with regard to an optical system through which the inner beam passes in the third example.

FIG. 30A is a graph showing a wavefront aberration with regard to an optical system through which the outer beam passes. FIG. 30B is a graph showing a wavefront aberration with regard to an optical system through which the inner beam passes. In each graph, the longitudinal axis represents an image height (unit: mm), and the horizontal axis represents an amount of aberration. The unit of the amount of aberration in each of FIGS. 26A–26D, 27A, 27B, 28A, 28B is a millimeter. The unit of the amount of aberration in each of FIGS. 29A and 29B is a percent. The unit of the amount of aberration in each of FIGS. 30A and 30B is a wavelength.

FIGS. 31A–31C are graphs showing wavefront aberrations of the scanning optical system 300 with regard to the outer beam L1. FIGS. 32A–32C are graphs showing wavefront aberrations of the scanning optical system 300 with regard to the inner beam L2. Graphs of the FIGS. 31A and 32A represent aberrations at image height Y=108 mm on the photoconductive drums 61 and 62, respectively. Graphs of the FIGS. 31B and 32B represent aberrations at image height Y=0 mm on the photoconductive drums 61 and 62, respectively. Graphs of the FIGS. 31C and 32C represent aberrations at image height Y=−108 mm on the photoconductive drums 61 and 62, respectively. In each graph of the FIGS. 31A–31C and 32A–32C, ends on the longitudinal axis correspond to distances of ±0.2λ from the origin point.

As shown in FIGS. 26A–30B, the scanning optical system 300 according to the third example can compensate for both of a bow and a differential bow while satisfying essential characteristics for a scanning optical system such as a fθ characteristic, correction of a curvature of field. Further, as shown in FIGS. 31A–32C, according to the third example, a fluctuation of a wavefront is sufficiently suppressed.

FOURTH EXAMPLE

Figure 33:
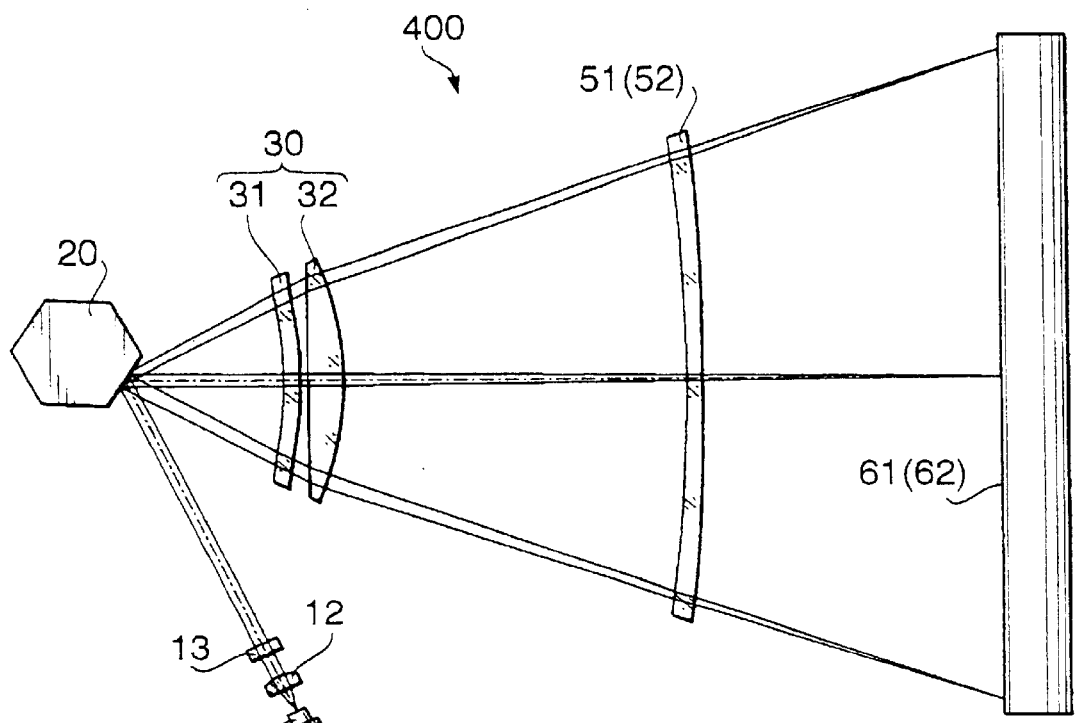
FIG. 33 is a developed view of a scanning optical system according to a fourth example viewed from a line parallel with a rotational axis of the polygonal mirror.
Figure 34:
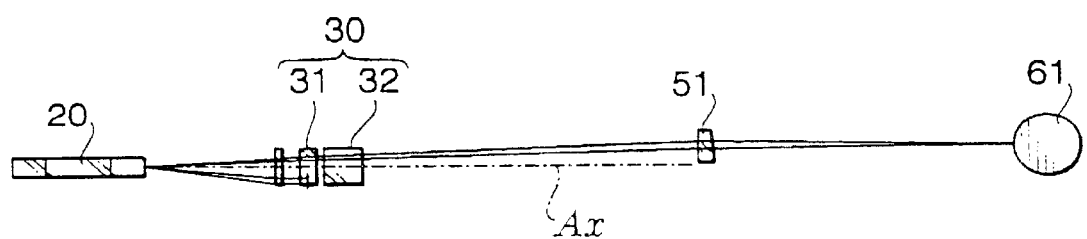
FIG. 34 is a developed view of the scanning optical system of the fourth example with regard to the outer beam viewed from a line parallel with the main scanning direction.
Figure 35:
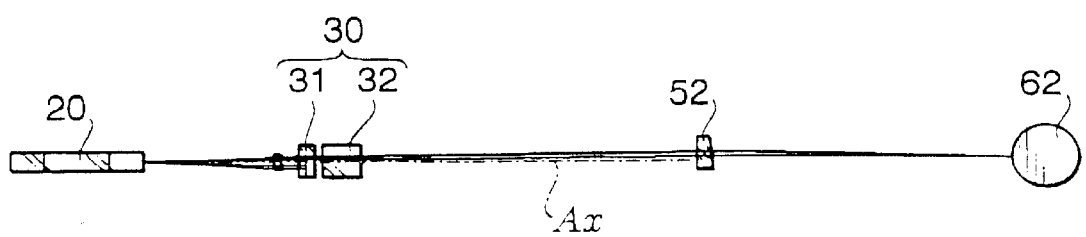
FIG. 35 is a developed view of the scanning optical system of the fourth example with regard to the inner beam viewed from a line parallel with the main scanning direction.

FIGS. 33–35 show a scanning optical system 400 according to a fourth example. FIG. 33 is a developed view of the scanning optical system 400 viewed from a line parallel with the rotational axis of the polygonal mirror 20. FIG. 34 is a developed view of the scanning optical system 400 with regard to the outer beam L1 viewed from a line parallel with the main scanning direction. FIG. 35 is a developed view of the scanning optical system 400 with regard to the inner beam L2 viewed from a line parallel with the main scanning direction.

In FIGS. 33–35, to elements which are similar to those in FIG. 1, the same reference numbers are assigned, and the detailed description thereof will not be repeated. As shown in FIG. 33, in the scanning optical system 400, the scanning lens 30 includes a first lens 31 and a second lens 32. Each of the first lens 31 and the compensation lenses 51–54 is made of plastic. The second lens 32 is made of glass.

TABLE 15 indicates a numerical structure of the scanning optical system 400 from the light incident side of the cylindrical lens 13 to the photoconductive drum. In TABLE 15, surfaces #1 and #2 represents surfaces of the cylindrical lens 13, surface #3 is the reflection surface of the polygonal mirror 20, surfaces #4 and #5 represent the first lens 31 of the scanning lens 30, surfaces #6 and #7 represent the second lens 32. Surfaces #8 and #9 represent the compensation lens 51(54) for the outer beam. Surface #10 represents the photoconductive drum 61(64) for the outer beam. Surfaces #11 and #12 represent the compensation lens 52(53) for the inner beam. Surface #13 represents the photoconductive drum 62(63) for the inner beam. Each symbol in TABLE 15 has the same meaning as that in TABLE 1.

TABLE 15 focal length = 200 mm
scanning width = 216 mm
design wavelength = 780 nm
incident angle with respect to polygonal mirror
65° (main scanning direction)
2.76° (auxiliary scanning direction; outer beam)
0.92° (auxiliary scanning direction; inner beam)

| Surface | Ry | Rz | d | n | DECZ |
|---|---|---|---|---|---|
| #1 | ∞ | −51.08 | 4.00 | 1.51072 | 0.00 |
| #2 | ∞ | — | 97.00 | — | — |
| #3 | ∞ | — | 48.50 | — | 0.00 |
| #4 | −100.00 | — | 5.00 | 1.48617 | 0.00 |
| #5 | −100.00 | −100.00 | 2.50 | — | — |
| #6 | ∞ | — | 11.50 | 1.51072 | 0.00 |
| #7 | −100.00 | — | 102.50 | — | — |
| #8 | −612.20 | — | 5.00 | 1.48617 | 6.00 |
| #9 | −2000.00 | — | 91.87 | — | — |
| #10 | ∞ | — | 0.00 | — | 5.32 |
| #11 | −619.40 | — | 5.00 | 1.48617 | 2.50 |
| #12 | −2000.00 | — | 91.78 | — | — |
| #13 | ∞ | — | 0.00 | — | 2.32 |

In TABLE 15, surface #1 is a cylindrical surface, surfaces #2 and #3 are planar surfaces, surface #4 is a rotationally symmetrical aspherical surface, and surface #5 is an anamorphic spherical surface. Surface #6 is a planar surface, surfaces #7, #8 and #11 are spherical surfaces, and surface #9 and #12 are aspherical surfaces defined by two-dimensional polynomial expressions.

Conical coefficients and aspherical coefficients for the surface #4 are indicated in TABLE 16.

TABLE 16

| κ | 0.00 |
|---|---|
| $A_4$ | $2.00 \times 10^{-6}$ |
| $A_6$ | $1.18 \times 10^{-10}$ |

Values of the coefficients for the surface #5 are indicated in TABLE 17.

TABLE 17 surface #5
κ = 0.000

| $AM_1 =$ | 0.00 | $AS_1 =$ | $5.96 \times 10^{-6}$ |
|---|---|---|---|
| $AM_2 =$ | $-1.09 \times 10^{-6}$ | $AS_2 =$ | $7.34 \times 10^{-6}$ |
| $AM_3 =$ | 0.00 | $AS_3 =$ | $1.95 \times 10^{-8}$ |
| $AM_4 =$ | $1.87 \times 10^{-6}$ | $AS_4 =$ | $1.73 \times 10^{-9}$ |
| $AM_5 =$ | 0.00 | $AS_5 =$ | $-1.45 \times 10^{-11}$ |
| $AM_6 =$ | $1.07 \times 10^{-10}$ | $AS_6 =$ | $-7.02 \times 10^{-13}$ |

Values of the coefficients for the surface #9 of the compensation lens 51 and the surface #12 of the compensation lens 52 are indicated in TABLE 18 and TABLE 19, respectively.

TABLE 18 surface #9 for the outer beams

| $B_{mn}$ | n = 0 | n = 1 | n = 2 | n = 3 | n = 4 |
|---|---|---|---|---|---|
| m = 0 | — | $-4.618 \times 10^{-2}$ | $-1.683 \times 10^{-2}$ | $-8.628 \times 10^{-6}$ | $2.190 \times 10^{-7}$ |
| m = 2 | $3.008 \times 10^{-6}$ | $8.414 \times 10^{-7}$ | $3.774 \times 10^{-7}$ | $5.453 \times 10^{-9}$ | $-1.141 \times 10^{-11}$ |
| m = 4 | $-8.511 \times 10^{-8}$ | $-1.012 \times 10^{-10}$ | $-2.645 \times 10^{-11}$ | $6.649 \times 10^{-13}$ | $2.035 \times 10^{-15}$ |
| m = 6 | $5.845 \times 10^{-12}$ | $4.956 \times 10^{-15}$ | $-1.620 \times 10^{-15}$ | $6.486 \times 10^{-17}$ | 0.000 |
| m = 8 | $-3.288 \times 10^{-16}$ | 0.000 | 0.000 | 0.000 | 0.000 |

TABLE 19 surface #12 for the inner beams

| $B_{mn}$ | n = 0 | n = 1 | n = 2 | n = 3 | n = 4 |
|---|---|---|---|---|---|
| m = 0 | — | $-2.969 \times 10^{-2}$ | $-1.688 \times 10^{-2}$ | $-2.601 \times 10^{-6}$ | $2.039 \times 10^{-7}$ |
| m = 2 | $3.469 \times 10^{-5}$ | $6.150 \times 10^{-7}$ | $3.906 \times 10^{-7}$ | $5.960 \times 10^{-9}$ | $-1.110 \times 10^{-11}$ |
| m = 4 | $-8.347 \times 10^{-8}$ | $-5.460 \times 10^{-11}$ | $-2.541 \times 10^{-11}$ | $4.052 \times 10^{-14}$ | $2.253 \times 10^{-15}$ |
| m = 6 | $5.625 \times 10^{-12}$ | $1.600 \times 10^{-15}$ | $3.308 \times 10^{-16}$ | $-5.140 \times 10^{-17}$ | 0.000 |
| m = 8 | $-3.181 \times 10^{-16}$ | 0.000 | 0.000 | 0.000 | 0.000 |

Figure 36A:
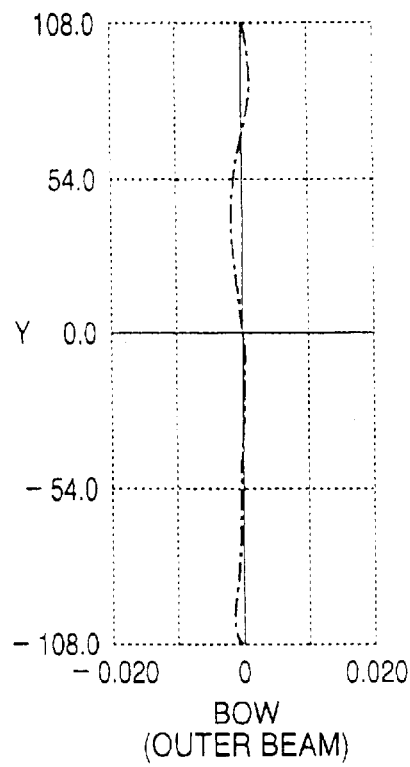
FIG. 36A is a graph showing a bow as to the outer beam in the fourth example.
Figure 36B:
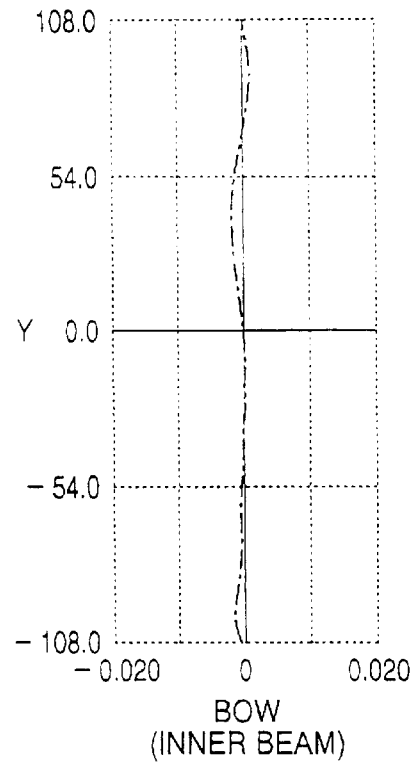
FIG. 36B is a graph showing the bow as to the inner beam in the fourth example.
Figure 36C:
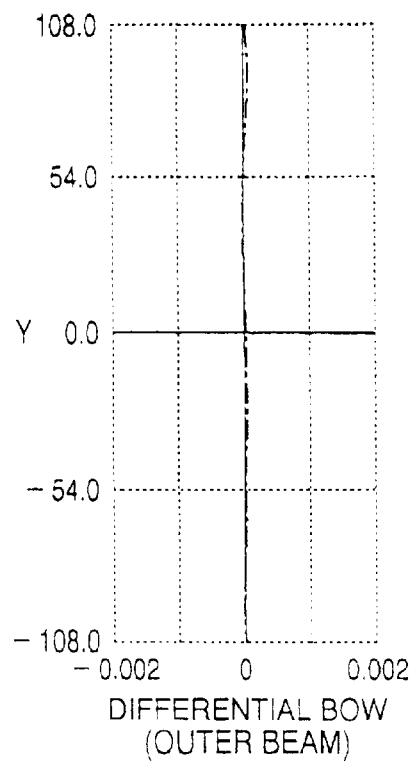
FIG. 36C is a graph showing a differential bow with regard to outer beams impinging on the same photoconductive drum in the fourth example.
Figure 36D:
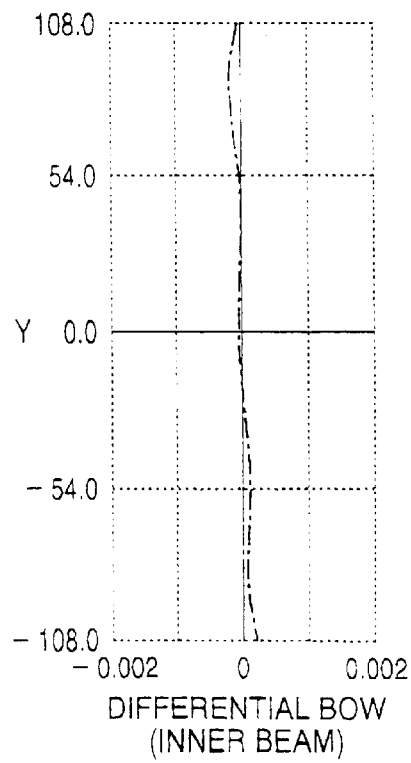
FIG. 36D is a graph showing the differential bow with regard to inner beams impinging on the same photoconductive drum in the fourth example.

FIGS. 36A–40B are graphs showing aberrations of the scanning optical system 400. FIG. 36A is a graph showing a curve of a scanning line (i.e., a bow) with regard to the outer beam L1. FIG. 36B is a graph showing a curve of a scanning line (i.e., a bow) with regard to the inner beam L2. FIG. 36C is a graph showing a differential bow with regard to the outer beams (i.e. a difference between bows of outer beams L1 and L5). FIG. 36D is a graph showing a differential bow with regard to the inner beams (i.e. a difference between bows of inner beams L2 and L6).

Figure 37A:
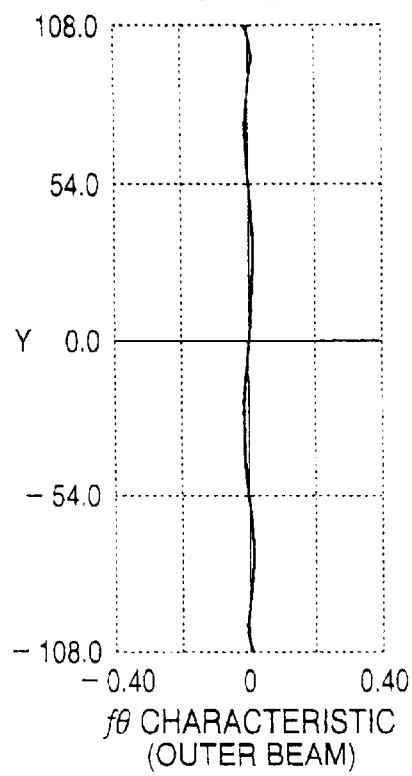
FIG. 37A is a graph showing a fθ characteristic with regard to the outer beam in the fourth example.
Figure 37B:
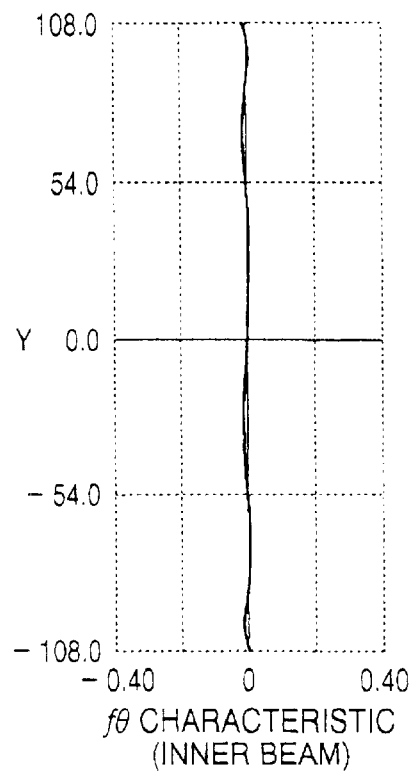
FIG. 37B is a graph showing a fθ characteristic with regard to the inner beam in the fourth example.
Figure 38A:
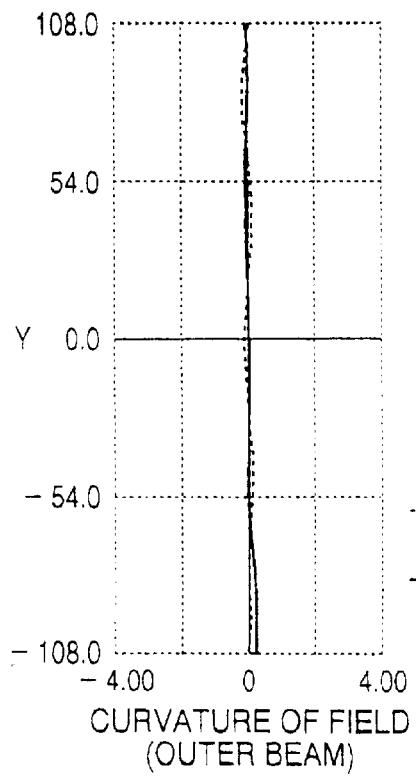
FIG. 38A is a graph showing curvature of field as to the outer beam in the fourth example.
Figure 38B:
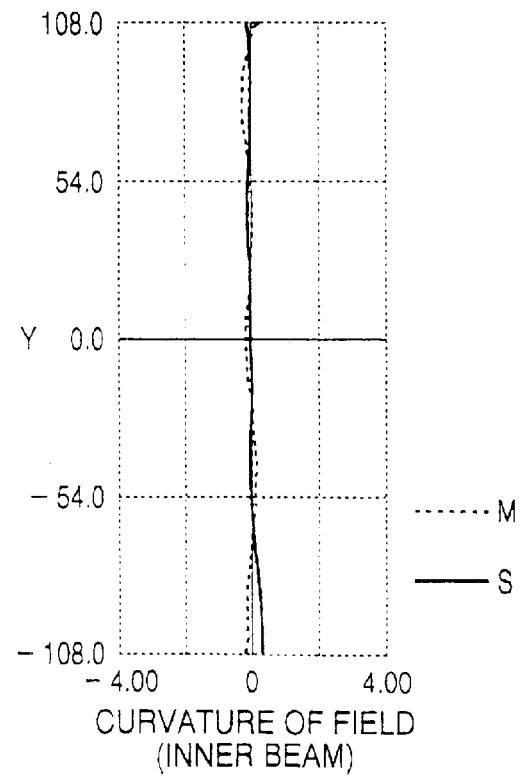
FIG. 38B is a graph showing curvature of field as to the inner beam in the fourth example.
Figure 39A:
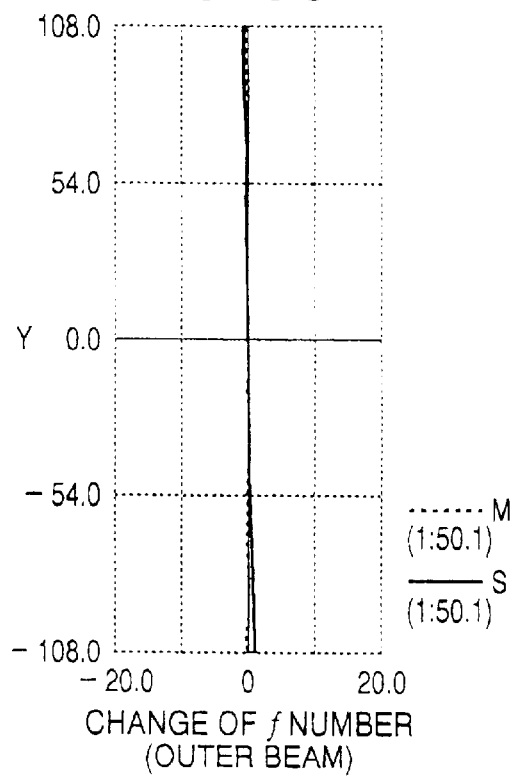
FIG. 39A is a graph showing a change of f number with regard to the outer beam in the fourth example.
Figure 39B:
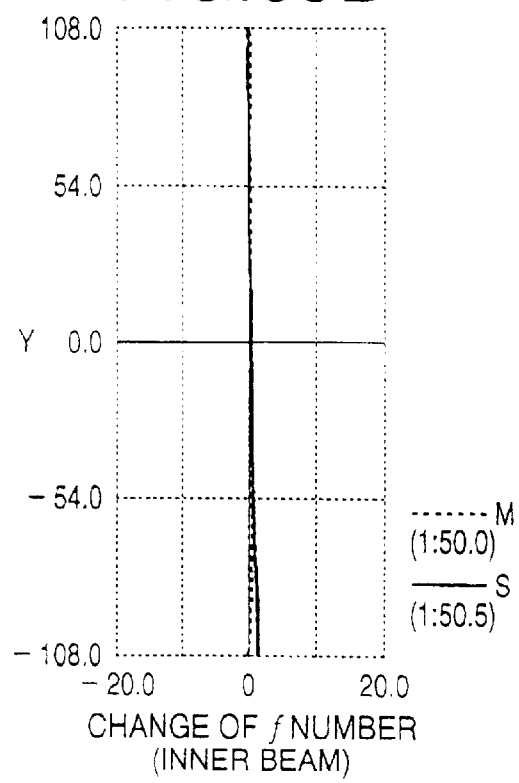
FIG. 39B is a graph showing a change of f number with regard to the inner beam in the fourth example.

FIGS. 37A and 37B are graphs showing fθ characteristics with regard to the outer beam and the inner beam, respectively. FIG. 38A is a graph showing curvature of field with regard to the outer beam. FIG. 38B is a graph showing curvature of field with regard to the inner beam. FIG. 39A is a graph showing a change of f number with regard to the outer beam. FIG. 39B is a graph showing a change of f number with regard to the inner beam. In each of the FIGS. 38A, 38B, 39A and 39B, a broken line M and a solid line S show characteristics as to the main scanning direction and the auxiliary scanning direction, respectively.

Figure 40A:
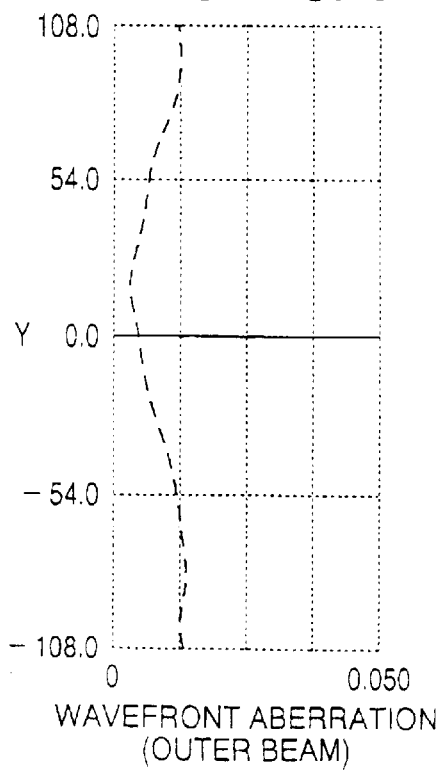
FIG. 40A is a graph showing a wavefront aberration with regard to an optical system through which the outer beam passes in the fourth example.
Figure 40B:
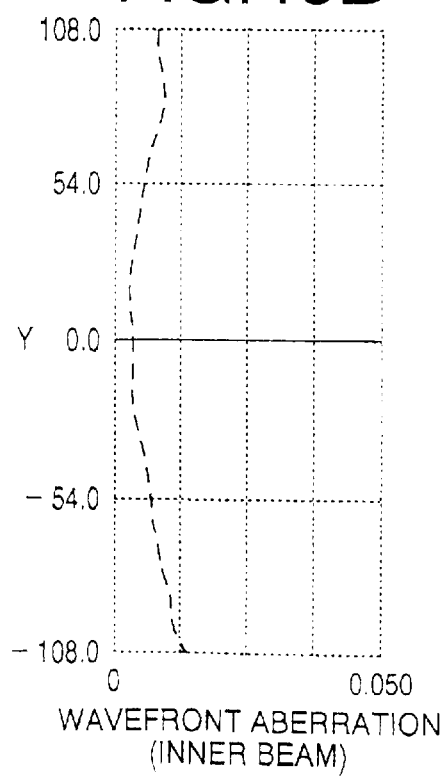
FIG. 40B is a graph showing a wavefront aberration with regard to an optical system through which the inner beam passes in the fourth example.

FIG. 40A is a graph showing a wavefront aberration with regard to an optical system through which the outer beam passes. FIG. 40B is a graph showing a wavefront aberration with regard to an optical system through which the inner beam passes. In each graph, the longitudinal axis represents an image height (unit: mm), and the horizontal axis represents an amount of aberration. The unit of the amount of aberration in each of FIGS. 36A–36D, 37A, 37B, 38A, 38B is a millimeter. The unit of the amount of aberration in each of FIGS. 39A and 39B is a percent. The unit of the amount of aberration in each of FIGS. 40A and 40B is a wavelength.

FIGS. 41A–41C are graphs showing wavefront aberrations of the scanning optical system 400 with regard to the outer beam L1. FIGS. 42A–42C are graphs showing wavefront aberrations of the scanning optical system 400 with regard to the inner beam L2. Graphs of FIGS. 41A and 42A represent aberrations at image height Y=108 mm on the photoconductive drums 61 and 62, respectively. Graphs of FIGS. 41B and 42B represent aberrations at image height Y=0 mm on the photoconductive drums 61 and 62, respectively. Graphs of FIGS. 41C and 42C represent aberrations at image height Y=−108 mm on the photoconductive drums 61 and 62, respectively. In each graph of FIGS. 41A–41C and 42A–42C, ends on the longitudinal axis correspond to distances of ±0.2λ from the origin point.

As shown in FIGS. 36A–40B, the scanning optical system 400 according to the fourth example can compensate for both of a bow and a differential bow while satisfying essential characteristics for a scanning optical system such as a fθ characteristic, correction of a curvature of field. Further, as shown in FIGS. 41A–42C, according to the fourth example, a fluctuation of a wavefront is sufficiently suppressed.

FIGS. 43A and 43B are graphs showing wavefront aberrations if the aspherical surface defined by the two-dimensional polynomial expression of each of the compensation lenses 51–54 provided in the scanning optical system 110 according to the first example is replaced with a toric surface. FIGS. 43A and 43B show wavefront aberrations at image height Y=108 mm with regard to the outer beam and the inner beam, respectively. As can be seen by making a comparison between FIGS. 43A–43B and FIGS. 11A–12C, if the aspherical surface defined by the two-dimensional expression is not used, a fluctuation of a wavefront becomes greater. As a result, on the photoconductive surface, a beam spot whose diameter is reduced to an appropriate value cannot be obtained.

Since a fluctuation of a wavefront is sufficiently reduced in each example of the invention described above, an imaging accuracy of the scanning optical system according to the embodiment is maintained at a high level.

Next, shapes of the anamorphic aspherical surface of the scanning lens 30 and the aspherical surfaces defined by two-dimensional polynomial expressions of the compensation lenses 51–54 will be described in detail with reference to the accompanying drawings.

For the anamorphic aspherical surface of the scanning lens 30, each of FIGS. 44A–44D is a graph showing a curvature of the arc extending in the auxiliary scanning direction. FIGS. 44A, 44B, 44C and 44D correspond to the first, second, third and fourth examples, respectively. In each graph, the horizontal axis represents a distance from the optical axis, and the longitudinal axis represents a curvature. As can be seen in FIGS. 44A–44D, the curvature of the arc of the anamorphic surface extending in the auxiliary scanning direction reduces as the distance from the optical axis increases for each of the examples.

For the aspherical surfaces defined by two-dimensiona polynomial expressions, each of FIGS. 45A–45D is a graph showing the angle of the tilt of the cross-sectional shape in a plane parallel with the auxiliary scanning plane. FIGS. 45A, 45B, 45C and 45D correspond to the first, second, third and fourth examples, respectively. In each graph, the horizontal axis represents a distance from the central point of the surface, and longitudinal axis represents the angle of the tilt. In each graph, a solid line represents the angle of the tilt of the compensation lens 51(54) for the outer beams, and a broken line represents the angle of the tilt of the compensation lens 52(53) for the inner beams. As can be seen in FIGS. 45A–45D, the angle of the tilt increases as the distance from the origin point of the surface increases for each of the examples.

Next, the conditions (1) and (2) are described in detail for each of the examples. In each example, an incident angle βin of the inner beam L2 with respect to the polygonal mirror 20 is 0.923°, and an incident angle βout of the outer beam L1 with respect to the polygonal mirror 20 is 2.759°. Therefore, for each of the examples, the ratio of the incident angle Δβ is 2.99.

TABLE 20 indicates Δdx/dz of the anamorphic aspherical surface of the scanning lens 30 for each of the examples.

TABLE 20

|  | FIRST EXAMPLE | SECOND EXAMPE | THIRD EXAMPLE | FOURTH EXAMPLE |
|---|---|---|---|---|
| b2 − b1 | 0.014206 | 0.005826 | 0.005457 | 0.017759 |
| a2 − a1 | 0.004731 | 0.001939 | 0.001825 | 0.005914 |
| Δdx/dz | 3.00296 | 3.00394 | 3.00017 | 3.00282 |

Since the lower limit of the condition (1) 0.95×Δβ is 2.841 and the upper limit of the condition (1) 1.05×Δβ is 3.140, each example satisfies the condition (1).

TABLE 21 indicates Δdx0/dz0 of the aspherical surface defined by the two-dimensional polynomial expression of each of the compensation lenses 51–54. In TABLE 21, Δdx0/dz0 is indicated for each of the examples.

TABLE 21

|  | FIRST EXAMPLE | SECOND EXAMPE | THIRD EXAMPLE | FOURTH EXAMPLE |
|---|---|---|---|---|
| b20 − b10 | 0.010943 | 0.005691 | 0.006699 | 0.017831 |
| a20 − a10 | 0.003846 | 0.001927 | 0.002411 | 0.006168 |
| Δdx0/dz0 | 2.845 | 2.886 | 2.779 | 2.891 |

Since the lower limit of the condition (2) 0.9×Δβ is 2.691 and the upper limit of the condition (2) 1.1×Δβ is 3.289, each example satisfies the condition (2).

Figure 46:
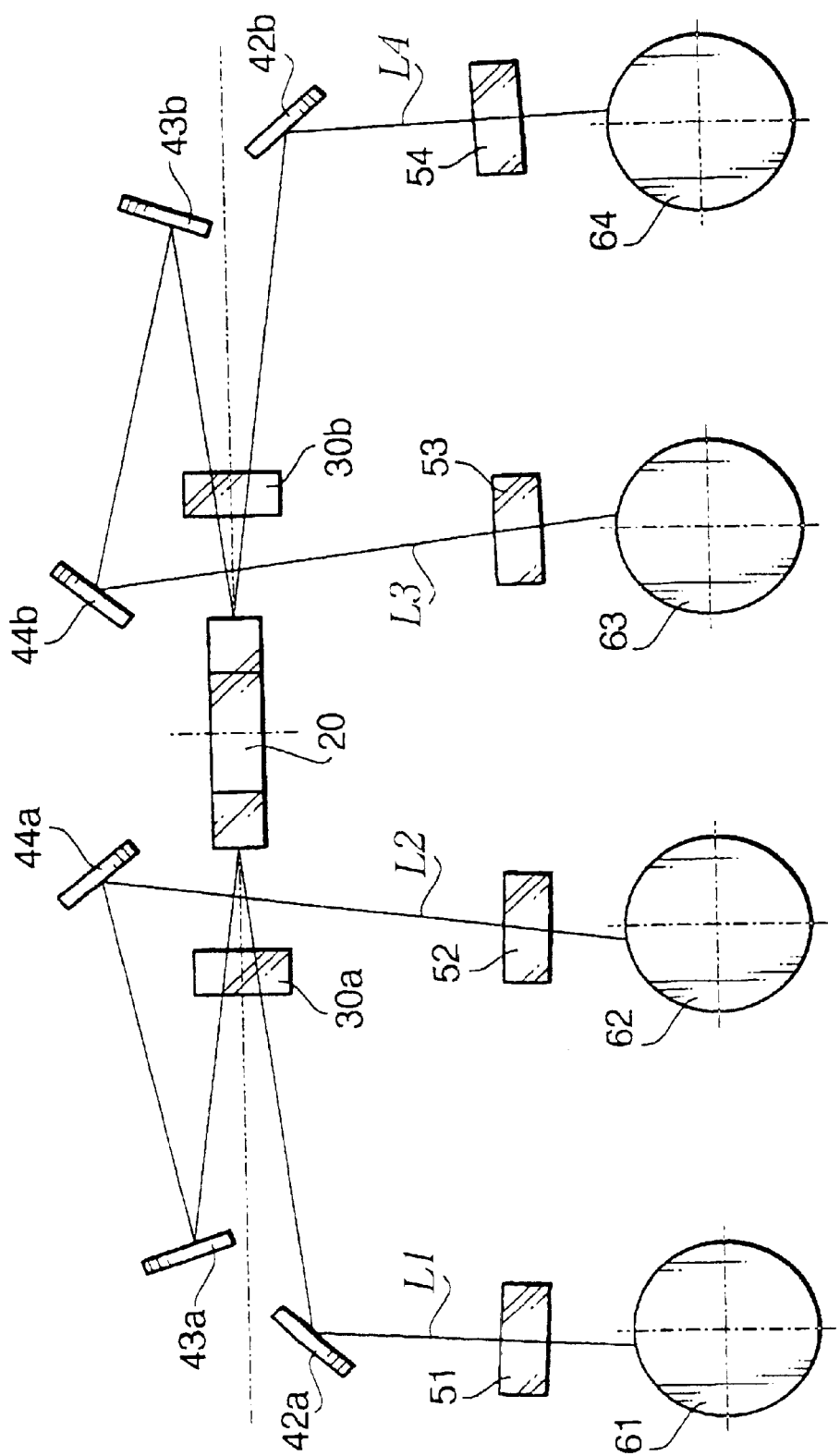
FIG. 46 shows a variation of the scanning optical system according to the embodiment viewed from a line parallel with the main scanning direction.

FIG. 46 shows a variation of the scanning optical system according to the embodiment viewed from a line parallel with the main scanning direction. The scanning optical system shown in FIG. 46 is a bidirectional scanning optical system in which beams are deflected bidirectionally by two reflection surfaces of the polygonal mirror 20. Such a bidirectional scanning optical system is configured such that beams emitted by two light sources (not shown) are incident on the two reflection surfaces of the polygonal mirror 20, respectively. Two beams (e.g., L1 and L2) are incident on the same reflection surface of the polygonal mirror 20. Incident angles of the two beams (L1 and L2), in the auxiliary scanning direction, with respect to the reflection surface have opposite signs, and absolute values of the incident angles are equal.

As shown in FIG. 46, a scanning lens 30a is provided for one pair of beams (L1, L2), and a scanning lens 30b is provided for the other pair of beams (L3, L4). Compensation lenses 51–54 are arranged such that incident angles of the incident beams are substantially the same.

The beams L1 and L2 deflected by the reflection surface of the polygonal mirror 20 pass through the scanning lens 30a. Then, the beam L1 is reflected by a mirror 42a, passes through the compensation lens 51, and impinges on the photoconductive drum 61. The beam L2 is reflected by a mirror 43a and a mirror 44a, passes through the compensation lens 52, and impinges on the photoconductive drum 62.

The beams L3 and L4 deflected by the reflection surface of the polygonal mirror 20 pass through the scanning lens 30b. Then, the beam L3 is reflected by a mirror 43b and a mirror 44b, passes through the compensation lens 53, and impinges on the photoconductive drum 63. The beam L4 is reflected by a mirror 42b, passes through the compensation lens 54, and impinges on the photoconductive drum 64.

In FIG. 46, all of the absolute values of incident angles of the four beams, in the auxiliary scanning direction, with respect to the reflection surfaces of the polygonal mirror 20 are the same. Therefore, lenses which are identical in design to each other can be used as compensation lenses 51–54. It should be noted that, in the scanning optical system shown in FIG. 46, since the kinds of compensation lenses is reduced, the kinds of molds for lenses can be also reduced.

If the lenses are formed using the same mold, manufacturing errors of these lenses are also expected to be identical. It should be appreciated that, in such a case, differences among bows of scanning lines respectively formed on the, photoconductive drums 61–64 can be reduced in comparison with each example described above.

The present disclosure relates to the subject matter contained in Japanese Patent Application No. 2001-351847, filed on Nov. 16, 2001, which is expressly incorporated herein by reference in its entirety.

What is claimed is:

1. A scanning optical system for emitting at least one beam scanning in a main scanning direction, comprising:
   a light source that emits at least one beam;
   an anamorphic optical element that converges the at least one beam emitted by said light source in an auxiliary scanning direction which is perpendicular to the main scanning direction;
   a polygonal mirror that rotates and deflects the at least one beam emerged from said anamorphic optical element to scan in the main scanning direction within a predetermined angular range; and
   an imaging optical system that converges the at least one beam deflected by said polygonal mirror to form at least one beam spot on a surface to be scanned, said at least one beam spot scanning in the main scanning direction on the surface to be scanned,
   wherein said imaging optical system has:
      a scanning lens; and
      at least one compensation lens provided on the surface side with respect to said scanning lens, said at least one compensation lens compensating for curvature of field,
      wherein one surface of said scanning lens has an anamorphic aspherical surface, said anamorphic aspherical surface being defined as a surface whose curvature in the auxiliary scanning direction at a point spaced from an optical axis thereof in the main scanning direction is determined independently from a cross-sectional shape thereof along the main scanning direction, wherein one surface of said at least one compensation lens has an aspherical surface, said aspherical surface being defined as a surface in which a tilt angle of a cross-sectional shape in the auxiliary scanning direction changes with a position in the main scanning direction, said aspherical surface being asymmetrical with respect to a plane perpendicular to the auxiliary scanning direction and including a central point thereof.

2. The scanning optical system according to claim 1, wherein said anamorphic aspherical surface of said scanning lens is configured such that a cross-sectional shape thereof in the auxiliary scanning direction is formed as an arc.

3. The scanning optical system according to claim 2, wherein the curvature of said anamorphic aspherical surface in the auxiliary scanning direction decreases as a distance from the optical axis increases.

4. The scanning optical system according to claim 1, wherein said aspherical surface of said at least one compensation lens is defined by a two-dimensional polynomial expression in which a SAG amount between a point on said aspherical surface and a plane tangential to said aspherical surface at the central point is defined by coordinates along the main scanning direction and the auxiliary scanning direction.

5. The scanning optical system according to claim 4, wherein the tilt angle of the cross-sectional shape of said aspherical surface in the auxiliary scanning direction increases as a distance from the central point of said aspherical surface increases.

6. The scanning optical system according to claim 1,
wherein said light source emits a plurality of beams, said plurality of beams including first beams whose incident angles with respect to said polygonal mirror in the auxiliary scanning direction are different from each other, wherein said scanning lens has a single lens through which said plurality of beams deflected by said polygonal mirror pass, and wherein said at least one compensation lens includes a plurality of compensation lenses through which the first beams pass, respectively.

7. The scanning optical system according to claim 6,
wherein said plurality of beams include second beams whose incident angles with respect to said polygonal mirror in the auxiliary scanning direction are substantially the same, and wherein the second beams emerged from said scanning lens enter the same compensation lens.

8. The scanning optical system according to claim 6,
wherein said anamorphic aspherical surface of said scanning lens is symmetrical with respect to a line intersecting the optical axis and parallel with the main scanning direction, and wherein said aspherical surface of each of said plurality of compensation lenses is symmetrical with respect to a line intersecting the central point thereof and parallel with the auxiliary scanning direction.

9. The scanning optical system according to claim 8,
wherein said first beams include two beams, incident angles of said two beams with respect to said polygonal mirror in the auxiliary scanning direction having opposite signs and absolute values of the incident angles of said two beams being the same, and wherein two of said plurality of compensation lenses through which said two beams respectively pass are arranged such that said two of said plurality of compensation lenses are symmetrical with respect to a line extending along the optical axis of said scanning lens.

10. The scanning optical system according to claim 6,
wherein said first beams include inner beams and outer beams, incident angles of the outer beams with respect to said polygonal mirror in the auxiliary scanning direction are greater than those of the inner beams, and wherein said scanning optical system satisfies a condition:

$$0.95 \times \Delta\beta \leq \Delta dx/dz \leq 1.05 \times \Delta\beta$$

where, $$\Delta\beta = \beta out/\beta in;$$

$$\Delta dx/dz = (b2-b1)/(a2-a1);$$

βout is an angle when incident angles of the outer beams in the auxiliary scanning direction with respect to said polygonal mirror are represented by ±βout;

βin is an angle when incident angles of the inner beams in the auxiliary scanning direction with respect to said polygonal mirror are represented by ±βin;

a1 is an angle when angles formed between the inner beams situated at a central position within the predetermined angular range and said anamorphic aspherical surface of said scanning lens are represented by ±a1, the angles ±a1 being defined in a plane parallel with an auxiliary scanning plane that is a plane parallel with a rotational axis of said polygonal mirror and including the optical axis of said scanning lens;

a2 is an angle when angles formed between the inner beams situated at a marginal position within the predetermined angular range and said anamorphic aspherical surface of said scanning lens are represented by ±a2, the angles ±a2 being defined in a plane parallel with the auxiliary scanning plane;

b1 is an angle when angles formed between the outer beams situated at a central position within the predetermined angular range and said anamorphic aspherical surface of said scanning lens are represented by ±b1, the angles ±b1 being defined in a plane parallel with the auxiliary scanning plane; and b2 is an angle when angles formed between the outer beams situated at a marginal position within the predetermined angular range and said anamorphic aspherical surface of said scanning lens are represented by ±b2, the angles ±b2 being defined in a plane parallel with the auxiliary scanning plane.

11. The scanning optical system according to claim 6,
wherein said first beams include inner beams and outer beams, incident angles of the outer beams with respect to said polygonal mirror in the auxiliary scanning direction are greater than those of the inner beams, and wherein said scanning optical system satisfies a condition:

$$0.9 \times \Delta\beta \leq \Delta dx0/dz0 \leq 1.1 \times \Delta\beta$$

where, $$\Delta\beta = \beta out/\beta in;$$

$\Delta dx0/dz0 = (b20-b10)/(a20-a10);$ $\beta$out is an angle when incident angles of the outer beams in the auxiliary scanning direction with respect to said polygonal mirror are represented by ±$\beta$out;

$\beta$in is an angle when incident angles of the inner beams in the auxiliary scanning direction with respect to said polygonal mirror are represented by ±$\beta$in;

a10 is an angle when angles formed between the inner beams situated at a central position within the predetermined angular range and aspherical surfaces of corresponding compensation lenses for the inner beams are represented by ±a10, the angles ±a10 being defined in a plane parallel with an auxiliary scanning plane that is a plane parallel with a rotational axis of said polygonal mirror and including the optical axis of said scanning lens;

a20 is an angle when angles formed between the inner beams situated at a marginal position within the predetermined angular range and said aspherical surfaces of corresponding compensation lenses for the inner beams are represented by ±a20, the angles ±a20 being defined in a plane parallel with the auxiliary scanning plane;

b10 is an angle when angles formed between the outer beams situated at a central position within the predetermined angular range and aspherical surfaces of corresponding compensation lenses for the outer beams are represented by ±b10, the angles ±b10 being defined in a plane parallel with the auxiliary scanning plane; and b20 is an angle when angles formed between the outer beams situated at a marginal position within the predetermined angular range and said aspherical surfaces of corresponding compensation lenses for the outer beams are represented by ±b20, the angles ±b20 being defined in a plane parallel with the auxiliary scanning plane.

12. The scanning optical system according to claim 1, wherein said scanning lens has a first lens made of plastic and a second lens made of glass.

13. The scanning optical system according to claim 1, wherein said scanning lens has a single lens made of plastic.

14. The scanning optical system according to claim 6, said compensation lens provided for each of the first beams has a single lens made of plastic.

15. The scanning optical system according to claim 1, wherein said light source emits a plurality of beams including first beams and second beams, said first beams impinging on one reflection surface of said polygonal mirror and said second beams impinging on another reflection surface of said polygonal mirror, wherein said first beams include two beams, incident angles of said two beams of said first beams with respect to said one reflection surface of said polygonal mirror in the auxiliary scanning direction having opposite signs, absolute values of the incident angles of said two beams of said first beams being the same, wherein said second beams include two beams, incident angles of said two beams of said second beams with respect to said another reflection surface of said polygonal mirror in the auxiliary scanning direction having opposite signs, absolute values of the incident angles of said two beams of said second beams being the same, wherein said scanning lens includes first lens and second lens, said first beams deflected by said one surface of said polygonal mirror passing through said first lens, said second beams deflected by said another surface of said polygonal mirror passing through said second lens, and wherein said at least one compensation lens includes four single lenses, each of the four single lenses compensating for curvature of field, four beams including said two beams of said first beams and said two beams of said second beams passing through said four single lenses, respectively.

16. The scanning optical system according to claim 1, wherein said anamorphic aspherical surface of said scanning lens is configured such that the cross-sectional shape in the main scanning direction is defined as a function of a distance, in the main scanning direction, from the optical axis of said scanning lens, and the curvature in the auxiliary scanning direction is defined as a function of a distance, in the main scanning direction, from the optical axis, the cross-sectional shape in the main scanning direction and the curvature in the auxiliary scanning direction being defined independently from each other.

* * * * *